(12) United States Patent
Seow et al.

(10) Patent No.: US 11,914,956 B1
(45) Date of Patent: **\*Feb. 27, 2024**

(54) UNUSUAL SCORE GENERATORS FOR A NEURO-LINGUISTIC BEHAVIORAL RECOGNITION SYSTEM

(71) Applicant: Intellective Ai, Inc., Dallas, TX (US)

(72) Inventors: Ming-Jung Seow, The Woodlands, TX (US); Gang Xu, Katy, TX (US); Tao Yang, Katy, TX (US); Wesley Kenneth Cobb, The Woodlands, TX (US)

(73) Assignee: Intellective Ai, Inc., Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/088,189

(22) Filed: Dec. 23, 2022

Related U.S. Application Data

(63) Continuation of application No. 17/164,210, filed on Feb. 1, 2021, now Pat. No. 11,537,791, which is a continuation-in-part of application No. 15/881,945, filed on Jan. 29, 2018, now Pat. No. 10,909,322, which is a continuation-in-part of application No. 15/177,069, filed on Jun. 8, 2016, now abandoned, which is a continuation-in-part of application No. 15/091,209, filed on Apr. 5, 2016, now Pat. No. 10,657,434.

(Continued)

(51) Int. Cl.
*G06F 40/237* (2020.01)
*G06F 40/30* (2020.01)

(52) U.S. Cl.
CPC ............ *G06F 40/237* (2020.01); *G06F 40/30* (2020.01)

(58) Field of Classification Search
CPC .............................. G06F 40/237; G06F 40/30
USPC ............................................................ 704/9
See application file for complete search history.

(56) References Cited

U.S. PATENT DOCUMENTS

| 10,657,434 B2 | 5/2020 | Seow et al. |
| 10,909,322 B1 | 2/2021 | Seow et al. |

(Continued)

OTHER PUBLICATIONS

D. B. Pisoni, H. C. Nusbaum and B. G. Greene, "Perception of synthetic soeech generated by rule," in Proceedings of the IEEE, vol. 73, No. 11, pp. 1665-1676, Nov. 1985, doi: 10.1109/PROC. 1985.13346. (Year: 1985) (Year: 1985).*

(Continued)

*Primary Examiner* — Bharatkumar S Shah
(74) *Attorney, Agent, or Firm* — COOLEY LLP

(57) ABSTRACT

Techniques are disclosed for generating anomaly scores for a neuro-linguistic model of input data obtained from one or more sources. According to one embodiment, generating anomaly scores includes receiving a stream of symbols generated from an ordered stream of normalized vectors generated from input data received from one or more sensor devices during a first time period. Upon receiving the stream of symbols, generating a set of words based on an occurrence of groups of symbols from the stream of symbols, determining a number of previous occurrences of a first word of the set of words, determining a number of previous occurrences of words of a same length as the first word, and determining a first anomaly score based on the number of previous occurrences of the first word and the number of previous occurrences of words of the same length as the first word.

20 Claims, 10 Drawing Sheets

Related U.S. Application Data

(60) Provisional application No. 62/318,964, filed on Apr. 6, 2016.

(56) References Cited

U.S. PATENT DOCUMENTS

| | | |
|---|---|---|
| 11,537,791 B1 | 12/2022 | Seow et al. |
| 2014/0067377 A1* | 3/2014 | Reiter .................. G06F 40/169 |
| | | 704/9 |
| 2014/0201838 A1* | 7/2014 | Varsanyi .............. G06F 21/552 |
| | | 726/23 |
| 2015/0046155 A1 | 2/2015 | Seow et al. |
| 2015/0047040 A1 | 2/2015 | Cobb et al. |
| 2015/0154508 A1 | 6/2015 | Chen |
| 2016/0170961 A1 | 6/2016 | Seow et al. |
| 2016/0170964 A1 | 6/2016 | Xu et al. |
| 2016/0203120 A1 | 7/2016 | Boguraev et al. |
| 2017/0024193 A1* | 1/2017 | Goubier .................... G06F 8/43 |
| 2017/0063894 A1 | 3/2017 | Muddu et al. |
| 2017/0279834 A1 | 9/2017 | Vasseur et al. |
| 2017/0293608 A1 | 10/2017 | Seow et al. |
| 2020/0257956 A1 | 8/2020 | Seow et al. |

OTHER PUBLICATIONS

Cyril Goutte; Nicola Cancedda; Marc Dymetman; George Foster, "A Statistical Machine Translation Primer," in Learning Machine Translation , MIT Press, 2009, pp. 1-37. (Year: 2009).*

Pisoni, David B., et al., "Perception of synthetic speech generated by rule", Proceedings of the IEEE (1985); 73(11): 1665-1676.

* cited by examiner

UNUSUAL SCORE GENERATORS FOR A NEURO-LINGUISTIC BEHAVIORAL RECOGNITION SYSTEM

This application is a continuation of U.S. patent application Ser. No. 17/164,210, filed Feb. 1, 2021, which is a continuation-in-part of U.S. patent application Ser. No. 15/881,945, filed Jan. 29, 2018, now U.S. Pat. No. 10,909,322, which is a continuation-in-part of U.S. patent application Ser. No. 15/091,209, filed Apr. 5, 2016, now U.S. Pat. No. 10,657,434, and which is also a continuation-in-part of U.S. patent application Ser. No. 15/177,069, filed Jun. 8, 2016, which in turn claims priority to and benefit of U.S. Provisional Patent Application No. 62/318,964, filed Apr. 6, 2016; the entireties of each of the aforementioned applications are herein expressly incorporated by reference for all purposes.

FIELD

Embodiments described herein generally relate to data analysis systems and more particularly to anomaly score adjustment across anomaly generators.

BACKGROUND

Many currently available surveillance and monitoring systems are trained to observe specific activities and alert an administrator after detecting those activities. Such systems are generally rules-based and require advance knowledge of what actions and/or objects to observe. The activities may be hard-coded into underlying applications or the system may train itself based on any provided definitions or rules. In other words, unless the underlying code includes descriptions of certain behaviors or rules for generating an alert for a given observation, the system is incapable of recognizing such behaviors. Such a rules-based approach is rigid. That is, unless a given behavior conforms to a predefined rule, an occurrence of the behavior can go undetected by the monitoring system. Even if the system trains itself to identify the behavior, the system requires rules to be defined in advance for what to identify. In addition, many surveillance systems, e.g., video surveillance systems, require a significant amount of computing resources, including processor power, storage, and bandwidth. For example, typical video surveillance systems require a large amount of computing resources per camera feed because of the typical size of video data. Given the cost of the resources, such systems are difficult to scale.

SUMMARY

One embodiment presented herein includes a method for generating anomaly scores for a neuro-linguistic model of input data obtained from one or more sources. The method generally includes receiving a stream of symbols generated from an ordered stream of normalized vectors generated from input data received from one or more sensor devices during a first time period. Upon receiving the stream of symbols, generating a set of words based on an occurrence of groups of symbols from the stream of symbols, determining a number of previous occurrences of a first word of the set of words, determining a number of previous occurrences of words of a same length as the first word, and determining a first anomaly score based on the number of previous occurrences of the first word and the number of previous occurrences of words of the same length as the first word.

Another embodiment presented herein includes a computer-readable storage medium storing instructions, which, when executed on a processor, performs an operation generating anomaly scores for a neuro-linguistic model of input data obtained from one or more sources. The operation itself generally includes receiving a stream of symbols generated from an ordered stream of normalized vectors generated from input data received from one or more sensor devices during a first time period. Upon receiving the stream of symbols, generating a set of words based on an occurrence of groups of symbols from the stream of symbols, determining a number of previous occurrences of a first word of the set of words, determining a number of previous occurrences of words of a same length as the first word, and determining a first anomaly score based on the number of previous occurrences of the first word and the number of previous occurrences of words of the same length as the first word Yet another embodiment presented herein includes a system having a processor and a memory storing one or more application programs configured to perform an operation for generating anomaly scores for a neuro-linguistic model of input data obtained from one or more sources. The operation itself generally includes receiving a stream of symbols generated from an ordered stream of normalized vectors generated from input data received from one or more sensor devices during a first time period. Upon receiving the stream of symbols, generating a set of words based on an occurrence of groups of symbols from the stream of symbols, determining a number of previous occurrences of a first word of the set of words, determining a number of previous occurrences of words of a same length as the first word, and determining a first anomaly score based on the number of previous occurrences of the first word and the number of previous occurrences of words of the same length as the first word.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Figure 1:
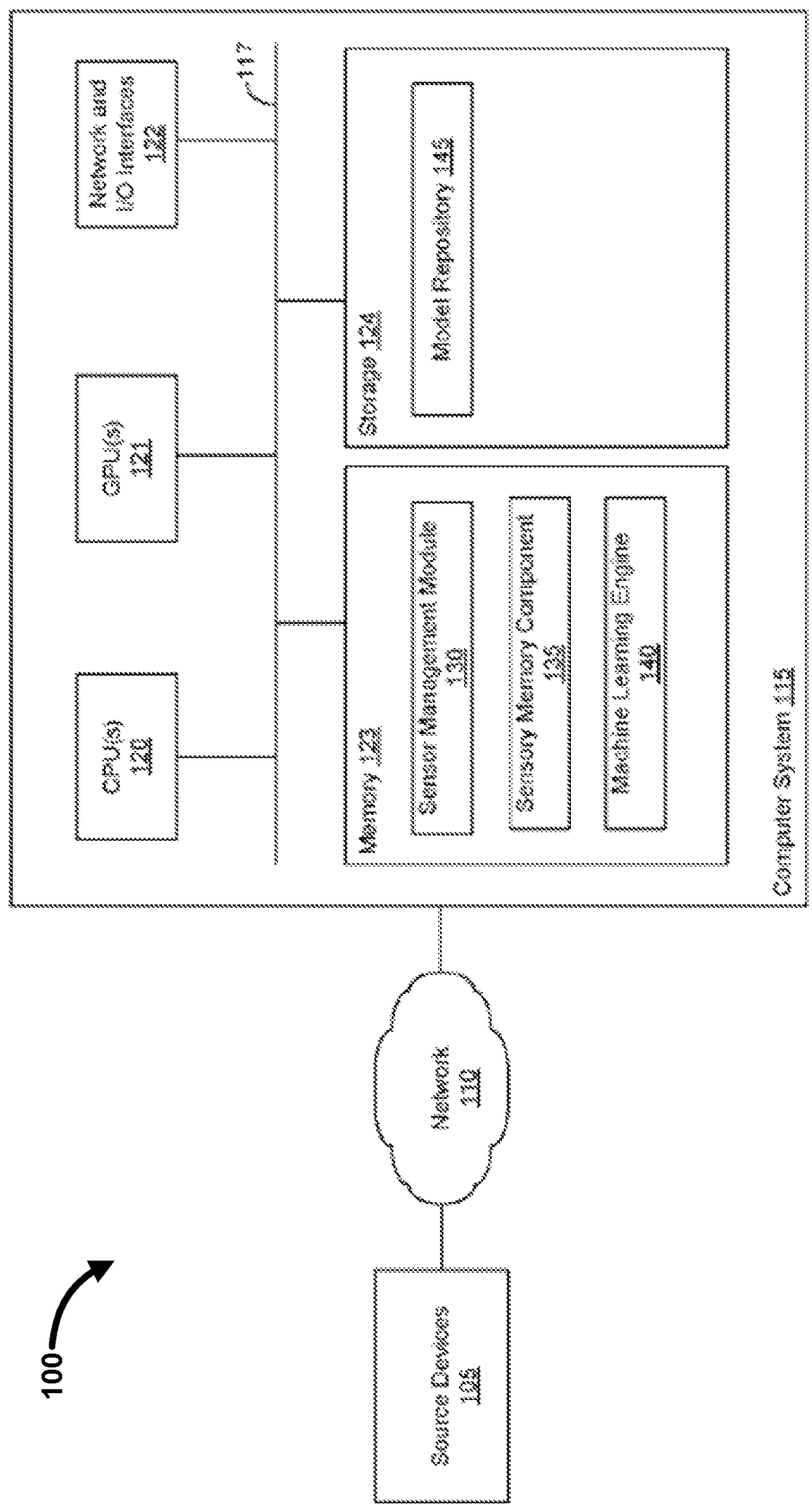
FIG. 1 illustrates an example computing environment for a neuro-linguistic behavior recognition system, according to some embodiments.

Embodiments presented herein describe a behavior recognition system. The behavior recognition system can be configured with one or more data collector components that collect raw data values from different data sources (e.g., video data, building management data, SCADA data, network data). For example, a behavior recognition system can be configured for video surveillance. The behavior recognition system can include a data collector component that retrieves video frames in real-time, separates foreground objects from background objects, and tracks foreground objects from frame-to-frame. The data collector component can normalize the video frame data into numerical values (e.g., falling within a range from 0 to 1 with respect to a given data type).

In some embodiments, the behavior recognition system includes a neuro-linguistic module that performs neural network-based linguistic analysis on the collected data. Specifically, for each type of data monitored by a sensor, the neuro-linguistic module creates and refines a linguistic model of the normalized data. That is, the neuro-linguistic module builds a grammar used to describe the normalized data. The linguistic model includes symbols that serve as building blocks for the grammar. The neuro-linguistic module identifies combinations of symbols to build a dictionary of words. Once the dictionary is built, the neuro-linguistic module identifies phrases that include various combinations of words in the dictionary. The behavior recognition system uses such a linguistic model to describe what is being observed. The linguistic model allows the behavior recognition system to distinguish between normal and abnormal activity observed in the input data. As a result, the behavior recognition system can issue alerts whenever abnormal activity occurs.

To generate the linguistic model, a neuro-linguistic module receives normalized data values and organizes the data into clusters. The neuro-linguistic module evaluates statistics of each cluster and identifies statistically relevant clusters. Further, the neuro-linguistic module generates symbols, e.g., letters, corresponding to each statistically relevant cluster. Thus, input values mapping to a given cluster can correspond to a symbol.

The neuro-linguistic module generates a lexicon, i.e., builds a dictionary, of observed combinations of symbols, i.e., words, based on a statistical distribution of symbols identified in the input data. Specifically, the neuro-linguistic module can identify patterns of symbols in the input data at different frequencies of occurrence. Further, the neuro-linguistic module can identify statistically relevant combinations of symbols at different lengths (e.g., from one-symbol to a maximum-symbol word length). The neuro-linguistic module can include such statistically relevant combinations of symbols in a dictionary used to identify phrases for the linguistic model.

Using words from the dictionary, the neuro-linguistic module generates phrases based on probabilistic relationships of each word occurring in sequence relative to other words as additional data is observed. For example, the neuro-linguistic module can identify a relationship between a given three-letter word that frequently appears in sequence with a given four-letter word, and so on. The neuro-linguistic module determines a syntax based on the identified phrases.

The syntax allows the behavior recognition system to learn, identify, and recognize patterns of behavior without the aid or guidance of predefined activities. Unlike a rules-based surveillance system, which contains predefined patterns of what to identify or observe, the behavior recognition system learns patterns by generalizing input and building behavior memories of what is observed. Over time, the behavior recognition system uses these memories to distinguish between normal and anomalous behavior reflected in observed data.

For example, the neuro-linguistic module builds letters, words, phrases, and estimates an "unusualness score" for each identified letter, word, or phrase. The unusualness score (for a letter, word, or phrase observed in input data) provides a measure of how infrequently the letter, word, or phrase has occurred relative to past observations. Thus, the behavior recognition system can use the unusualness scores to both measure how unusual a current syntax is, relative to a stable model of symbols (i.e., letters), a stable model of words built from the symbols (i.e., a dictionary) and a stable model of phrase built from the words (i.e., a syntax)—collectively the neuro-linguistic model.

As the neuro-linguistic module continues to receive input data, the neuro-linguistic module can decay, reinforce, and generate the letters, words, and syntax models. In parlance with the machine learning field, the neuro-linguistic module "learns on-line" as new data is received and occurrences a given type of input data either increases, decreases, appears, or disappears.

FIG. 1 illustrates an example computing environment for a neuro-linguistic behavior recognition system 100, according to some embodiments. As shown, the behavioral recognition system 100 includes one or more input source devices 105, a network 110, and one or more computer systems 115. The network 110 can transmit data input by the source devices 105 to the computer system 115. Generally, the computing environment 100 can include one or more physical computer systems 115 connected via a network (e.g., the Internet, wireless networks, local area networks). Alternatively, the computer systems 115 can be cloud computing resources connected by the network. Illustratively, the computer system 115 includes one or more central processing units (CPU) 120, one or more graphics processing units (GPU) 121, network and I/O interfaces 122, a storage 124 (e.g., a disk drive, optical disk drive, and the like), and a memory 123 that includes a sensor management module 130, a sensory memory component 135, and a machine learning engine 140. The memory 123 can comprise one or more memory devices, such as system memory and graphics memory. The memory 123 is generally included to be representative of a random access memory (e.g., DRAM, SRAM, SDRAM). The memory 123 and storage 124 can be coupled to the CPU 120, GPU 121, and network and I/O interfaces 122 across one or more buses 117. The storage 124 includes a model repository 145. Additionally, storage 124, can generally include one or more devices such as a hard disk drive, solid state device (SSD), or flash memory storage drive, and can store non-volatile data as required.

The CPU 120 retrieves and executes programming instructions stored in the memory 123 as well as stores and retrieves application data residing in the storage 124. In some embodiments, the GPU 121 implements a Compute Unified Device Architecture (CUDA). Further, the GPU 121 is configured to provide general purpose processing using the parallel throughput architecture of the GPU 121 to more efficiently retrieve and execute programming instructions stored in the memory 123 and also to store and retrieve application data residing in the storage 124. The parallel throughput architecture provides thousands of cores for processing the application and input data. As a result, the GPU 121 leverages the thousands of cores to perform read and write operations in a massively parallel fashion. Taking advantage of the parallel computing elements of the GPU 121 allows the behavior recognition system 100 to better process large amounts of incoming data (e.g., input from a video and/or audio source). As a result, the behavior recognition system 100 can scale with relatively less difficulty.

The sensor management module 130 provides one or more data collector components. Each of the collector components is associated with a particular input data source, e.g., a video source, a SCADA (supervisory control and data acquisition) source, an audio source, a network traffic source, etc. The collector components retrieve (or receive, depending on the sensor) input data from each source at specified intervals (e.g., once a minute, once every thirty minutes, once every thirty seconds, etc.). The sensor management module 130 controls the communications between the data sources. Further, the sensor management module 130 normalizes input data and sends the normalized data to the sensory memory component 135.

The sensory memory component 135 is a data store that transfers large volumes of data from the sensor management module 130 to the machine learning engine 140. The sensory memory component 135 stores the data as records. Each record can include an identifier, a timestamp, and a data payload. Further, the sensory memory component 135 aggregates incoming data in a time-sorted fashion. Storing incoming data from each of the data collector components in a single location where the data can be aggregated allows the machine learning engine 140 to process the data efficiently. Further, the computer system 115 can reference data stored in the sensory memory component 135 in generating alerts for anomalous activity. In some embodiments, the sensory memory component 135 can be implemented in via a virtual memory file system in the memory 123. In another embodiment, the sensory memory component 135 is implemented using a key-value share.

The machine learning engine 140 receives data output from the sensor management module 135. Generally, components of the machine learning engine 140 generate a linguistic representation of the normalized vectors. As described further below, to do so, the machine learning engine 140 clusters normalized values having similar features and assigns a distinct symbol to each cluster. The machine learning engine 140 can then identify recurring combinations of symbols (i.e., words) in the data. The machine learning engine 140 then similarly identifies recurring combinations of words (i.e., phrases) in the data.

Note, however, FIG. 1 illustrates merely one possible arrangement of the behavior recognition system 100. For example, although the input data sources 105 are shown connected to the computer system 115 via network 110, the network 110 is not always present or needed (e.g., an input source such as a video camera can be directly connected to the computer system 115).

Figure 2:
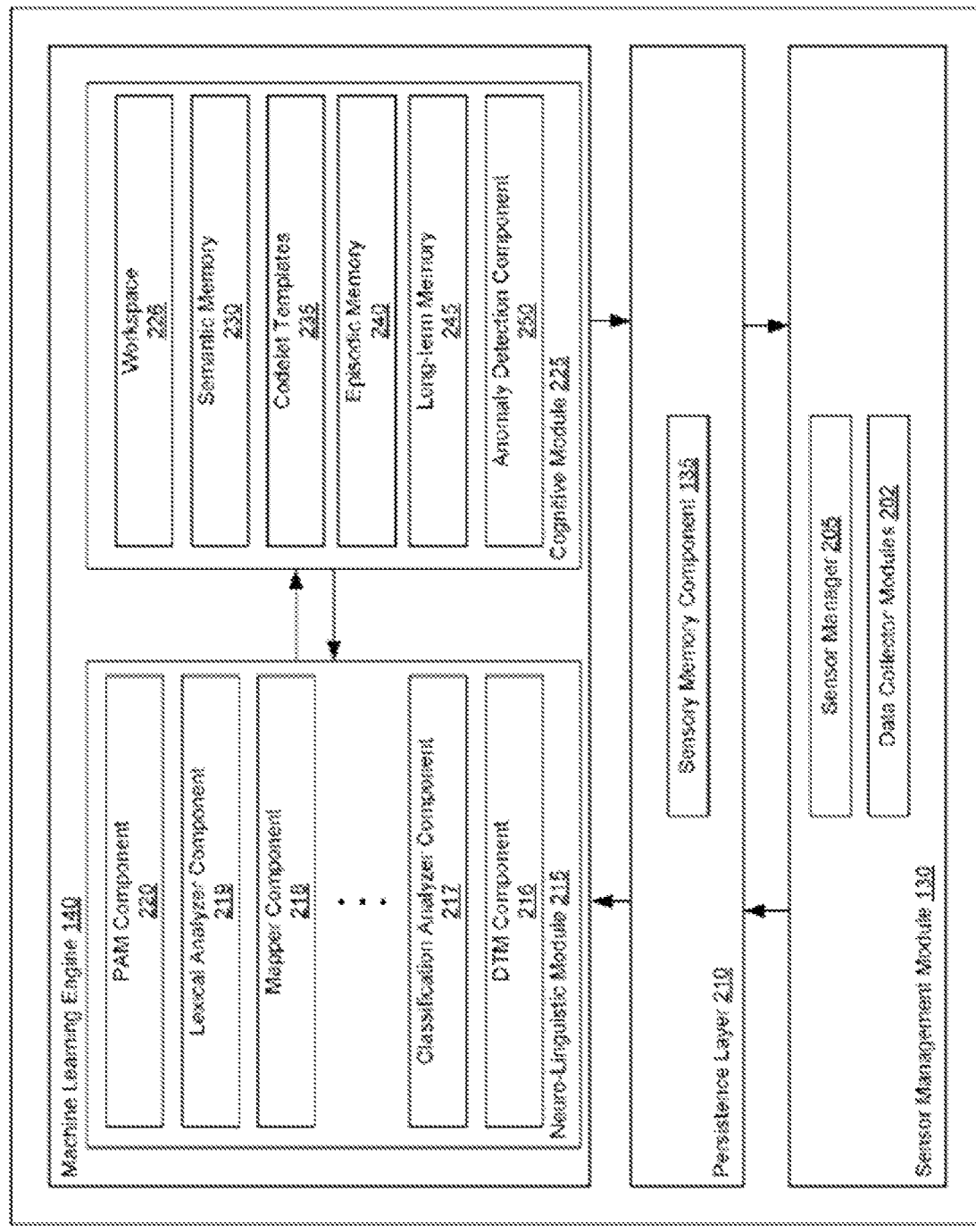
FIG. 2 illustrates a system architecture of the neuro-linguistic behavior recognition system, according to some embodiments.

FIG. 2 illustrates a system architecture of the neuro-linguistic behavior recognition system, according to some embodiments. As shown, the sensor management module 130 and the machine learning engine 140 communicate via a persistence layer 210.

The persistence layer 210 includes data stores that maintain information used by components of the computer system 115. For example, the persistence layer 210 includes data stores that maintain information describing properties of the data collector modules 202, system properties (e.g., serial numbers, available memory, available capacity, etc. of the computer system 115), and properties of the source driver (e.g., active plug-ins 118, active sensors associated with each data source, normalization settings, etc.). Other data stores can maintain learning model information, system events, and behavioral alerts. In addition, the sensory memory component 135 resides in the persistence layer 210.

The machine learning engine 140 itself includes a neuro-linguistic module 215 and a cognitive module 225. The neuro-linguistic module 215 performs neural network-based linguistic analysis of normalized input data to build a neuro-linguistic model of the observed input data. The behavior recognition system can use the linguistic model to describe subsequently observed activity. However, rather than describing the activity based on pre-defined objects and actions, the neuro-linguistic module 215 develops a custom language based on symbols, words, and phrases generated from the input data. As shown, the neuro-linguistic module 215 includes a data transactional memory (DTM) component 216, a classification analyzer component 217, a mapper component 218, a lexical analyzer component 219, and a perceptual associative memory (PAM) component 220. Additionally in some embodiments, the neuro-linguistic module 215 can also contain additional modules, for example, a trajectory module, for observing and describing various activities.

In some embodiments, the DTM component 216 retrieves the normalized vectors of input data from the sensory memory component 135 and stages the input data in the pipeline architecture provided by the GPU 121. The classification analyzer component 217 evaluates the normalized data organized by the DTM component 216 and maps the data on a neural network. In some embodiments, the neural network is a combination of a self-organizing map (SOM) and an adaptive resonance theory (ART) network.

The mapper component 218 clusters the data streams based on values occurring repeatedly in association with one another. Further, the mapper component 218 generates a set of clusters for each input feature. For example, assuming that the input data corresponds to video data, features can include location, velocity, acceleration etc. The mapper component 218 would generate separate sets of clusters for each of these features. The mapper component 218 identifies symbols (i.e., builds an alphabet of letters) based on the clustered input data. Specifically, the mapper component 218 determines a statistical distribution of data in each cluster. For instance, the mapper component 218 determines a mean, variance, and standard deviation for the distribution of values in the cluster. The mapper component 218 also updates the statistics as more normalized data is received. Further, each cluster can be associated with a statistical significance score. The statistical significance for a given cluster increases as more data is received which maps to that cluster. In addition, the mapper component 218 decays the statistical significance of the cluster as the mapper component 218 observes data mapping to the cluster less often over time.

In some embodiments, the mapper component 218 assigns a set of symbols to clusters having statistical significance. A cluster can have statistical significance if a threshold amount of input data mapping to that cluster is exceeded. A symbol can be described as a letter of an alphabet used to create words used in the neuro-linguistic analysis of the input data. A symbol provides a "fuzzy" representation of the data belonging to a given cluster.

Further, the mapper component 218 is adaptive. That is, the mapper component 218 can identify new symbols corresponding to new clusters generated from the normalized data, as such clusters are reinforced over time (resulting in such clusters reaching a level statistical significance relative to the other clusters that emerge from the input data). The mapper component 218 "learns on-line" and can merge similar observations to a more generalized cluster. The mapper component 218 can assign a distinct symbol to the resulting cluster.

Once a cluster has reached statistical significance (i.e., data observed as mapping to that cluster has reached a threshold amount of points), the mapper component 219 begins sending corresponding symbols to the lexical analyzer component 219 in response to normalized data that maps to that cluster. In some embodiments, the mapper component 218 limits symbols that can be sent to the lexical component 219 to the most statistically significant clusters. In practice, outputting symbols (i.e., letters) assigned to the top thirty-two clusters has shown to be effective. However, other amounts may also prove effective, such as the top sixty-four or 128 most frequently recurring clusters. Note, over time, the most frequently observed symbols may change as clusters increase (or decrease) in statistical significance. As such, it is possible for a given cluster to lose statistical significance. Over time, thresholds for statistical significance can increase, and thus, if the amount of observed data mapping to a given cluster fails to meet a threshold, then the cluster loses statistical significance.

In some embodiments, the mapper component 218 evaluates an unusualness score for each symbol. The unusualness score is based on the frequency of a given symbol relative to other symbols observed in the input data stream, over time. The unusualness score may increase or decrease over time as the neuro-linguistic module 215 receives additional data.

The mapper component 218 sends a stream of the symbols (e.g., letters representing clusters), timestamp data, unusualness scores, and statistical data (e.g., a representation of the cluster associated with a given symbol) to the lexical analyzer component 219. The lexical analyzer component 219 builds a dictionary based on symbols output from the mapper component 218. In practice, the mapper component 218 may need approximately 5000 observations (i.e., normalized vectors of input data) to generate a stable alphabet of symbols.

The lexical analyzer component 219 builds a dictionary that includes combinations of co-occurring symbols, e.g., words, from the symbols transmitted by the mapper component 218. The lexical analyzer component 219 identifies repeating co-occurrences of letters and features output from the mapper component 218 and calculates frequencies of the co-occurrences occurring throughout the symbol stream. The combinations of symbols may represent a particular activity, event, etc.

In some embodiments, the lexical analyzer component 219 limits the length of words in the dictionary to allow the lexical analyzer component 219 to identify a number of possible combinations without adversely affecting the performance of the computer system 115. Further, the lexical analyzer component 219 may use level-based learning models to analyze symbol combinations and learn words. The lexical analyzer component 219 learns words up through a maximum symbol combination length at incremental levels, i.e., where one-letter words are learned at a first level, two-letter words are learned at a second level, and so on. In practice, limiting a word to a maximum of five or six symbols has shown to be effective.

Like the mapper component 218, the lexical analyzer component 219 is adaptive. That is, the lexical analyzer component 219 may learn and generate words in the dictionary over time. The lexical analyzer component 219 may also reinforce or decay the statistical significance of words in the dictionary as the lexical analyzer component 219 receives subsequent streams of symbols over time. Further, as discussed further below, the lexical analyzer component 219 may determine an unusualness score for each word based on how frequently the word recurs in the data. The unusualness score may increase or decrease over time as the neuro-linguistic module 215 processes additional data.

In addition, as additional observations (i.e., symbols) are passed to the lexical analyzer component 219 and identified as a being part of a given word, the lexical analyzer component 219 may determine that the word model has matured. Once a word model has matured, the lexical analyzer component 219 may output observations of those words in the model to the PAM component 219. In some embodiments, the lexical analyzer component 219 limits words sent to the PAM component 320 to the most statistically relevant words. In practice, for each single sample, outputting occurrences of the top thirty-two most frequently occurring words has shown to be effective (while the most frequently occurring words stored in the models can amount to thousands of words). Note, over time, the most frequently observed words may change as the observations of incoming letters change in frequency (or as new letters emerge by the clustering of input data by the mapper component 218.

Once the lexical analyzer component 219 has built the dictionary (i.e., identifies words that have a reached a predefined statistical significance), the lexical analyzer component 219 sends occurrences of words subsequently observed in the input stream to the PAM component 220. The PAM component 220 builds and outputs a syntax of phrases from the words output by the lexical analyzer component 219. In practice, lexical analyzer component 219 may build a useful dictionary of words after receiving approximately observations (i.e., input letters from the mapper component 218).

The PAM component 220 identifies a syntax of phrases based on the sequence of words output from the lexical analyzer component 219. Specifically, the PAM component 220 receives the words identified by the lexical analyzer component 219 generates a connected graph, where the nodes of the graph represent the words, and the edges represent a relationship between the words. The PAM component 220 may reinforce or decay the links based on the frequency that the words are connected with one another in a data stream. In addition, as discussed further below, the PAM component 220 may also determine an unusualness score for each identified phrase based on how frequently the phrase recurs in the linguistic data. The unusualness score may increase or decrease over time as the neuro-linguistic module 215 processes additional data.

Similar to the lexical analyzer component 219, the PAM component 220 may limit the length of a given phrase to allow the PAM component 220 to be able to identify a number of possible combinations without adversely affecting the performance of the computer system 115.

The PAM component 220 identifies syntax phrases over observations of words output from the lexical analyzer component 219. As observations of words accumulate, the PAM component 220 may determine that a given phrase has matured, i.e., a phrase has reached a measure of statistical relevance. The PAM component 220 then outputs observations of that phrase to the cognitive module 225. The PAM component 220 sends data that includes a stream of the symbols, words, phrases, timestamp data, unusualness scores, and statistical calculations to the cognitive module 325. In practice, the PAM component 220 may obtain a meaningful set of phrases after observing about 5000 words from the lexical analyzer component 219.

After maturing, the generated letters, words, and phrases form a stable neuro-linguistic model of the input data that the computer system 115 uses to compare subsequent observations of letters, words, and phrases against the stable model. The neuro-linguistic module 215 updates the linguistic model as new data is received. Further, the neuro-linguistic module 215 may compare a currently observed syntax to the model. That is, after building a stable set of letters, the neuro-linguistic module 215 may build a stable model of words (e.g., a dictionary). In turn, the neuro-linguistic module 215 may be used to build a stable model of phrases (e.g., a syntax). Thereafter, when the neuro-linguistic module 215 receives subsequently normalized data, the module 215 can output an ordered stream of symbols, words, and phrases, all of which can be compared to the stable model to identify interesting patterns or detect deviations occurring in the stream of input data.

The cognitive module 225 performs learning analysis on the linguistic content (i.e., the identified symbols, words, phrases) delivered to semantic memory 230 by comparing new observations to the learned patterns in the stable neuro-linguistic model kept in semantic memory 230 and then estimating the unusualness of these new observations.

As shown, the cognitive module 225 includes a workspace 226, a semantic memory 230, codelet templates 235, episodic memory 240, long term memory 245, and an anomaly detection component 250. The semantic memory 230 stores the stable neuro-linguistic model described above, i.e., a stable copy from the mapper component 218, lexical analyzer component 219, and the PAM component 220.

In some embodiments, the workspace 226 provides a computational engine for the machine learning engine 140. The workspace 226 performs computations (e.g., anomaly modeling computations) and stores immediate results from the computations.

The workspace 226 retrieves the neuro-linguistic data from the PAM component 220 and disseminates this data to different portions of the cognitive module 225 as needed.

The episodic memory 240 stores linguistic observations related to a particular episode in the immediate past and may encode specific details, such as the "what" and the "when" of a particular event.

The long-term memory 245 stores generalizations of the linguistic data with particular episodic details stripped away. In this way, when a new observation occurs, memories from the episodic memory 240 and the long-term memory 245 may be used to relate and understand a current event, i.e., the new event may be compared with past experience (as represented by previously observed linguistic data), leading to both reinforcement, decay, and adjustments to the information stored in the long-term memory 245, over time. In a particular embodiment, the long-term memory 245 may be implemented as an ART network and a sparse-distributed memory data structure. Importantly, however, this approach does not require events to be defined in advance.

The codelet templates 235 provide a collection of executable codelets, or small pieces of code that evaluate different sequences of events to determine how one sequence may follow (or otherwise relate to) another sequence. The codelet templates 325 may include deterministic codelets and stochastic codelets. More generally, a codelet may detect interesting patterns from the linguistic representation of input data. For instance, a codelet may compare a current observation (i.e., a current phrase instance with what has been observed in the past) with previously observed activity stored in the semantic memory 230. By repeatedly scheduling codelets for execution, copying memories and percepts to/from the workspace 226, the cognitive module 225 performs a cognitive cycle used to observe, and learn, about patterns of behavior that occur within the linguistic data.

The anomaly detection component 250 evaluates unusualness scores sent by the neuro-linguistic module 215 to determine whether to issue an alert in response to some abnormal activity indicated by the unusualness scores. As further detailed below, the anomaly detection component 250 provides probabilistic histogram models (e.g., an unusual lexicon score model, an unusual syntax score model, and an anomaly model) which represent the unusualness scores. The unusual lexicon or word model and unusual syntax score model are generated based on unusualness scores sent from the lexical analyzer component 219 and the PAM component 220, respectively. The anomaly detection component 250 evaluates the unusualness scores of each of the symbols, words, and phrases to identify abnormal occurrences in the observed data and determines whether to send an alert based on a given score. The anomaly detection component 250 may send alert data to an output device, where an administrator may view the alert, e.g., via a management console.

Figure 3:
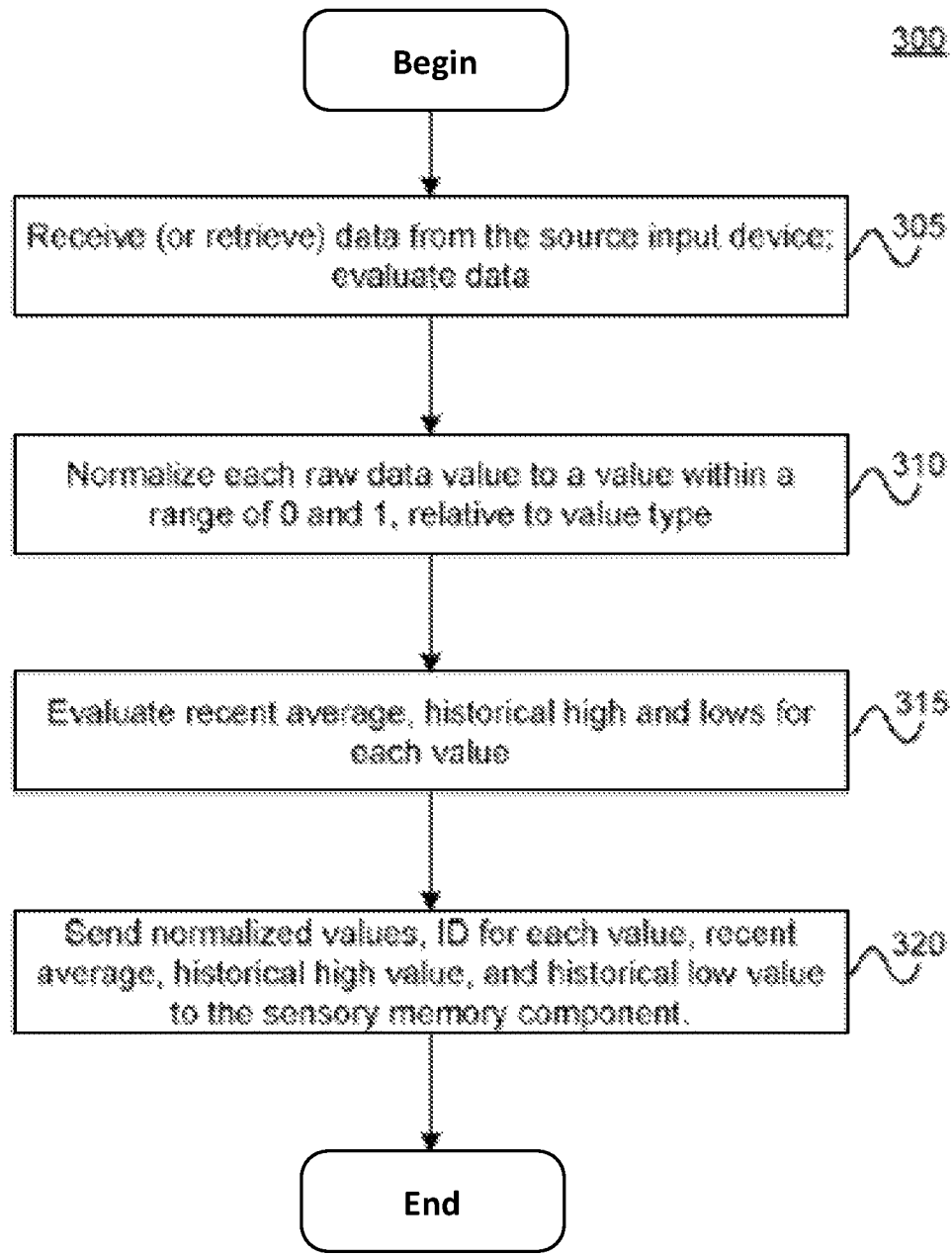
FIG. 3 illustrates a method for collecting sensor data for use in a neuro-linguistic behavior recognition system, according to some embodiments.

FIG. 3 illustrates a method 300 for collecting sensor data for use in the neuro-linguistic behavior recognition system, according to some embodiments. More specifically, method 300 describes a method for a data collector to retrieve or receive data from an associated input device and send the data to the neuro-linguistic module 215. For this example, assume that a data collector module 202 is a video source capturing image data at a given frame rate. Of course, a variety of data collector components 202 can be used.

Method 300 begins at step 305, where the data collector module 202 retrieves (or receives) data from the source input device. In this case, the data collector module 202 may retrieve video frames from a video source, such as a video camera positioned to observe a particular location, such as a hotel lobby. Further, the data collector module 202 identifies data values to send to the sensory memory component 135. To do so, the data collector module 202 may evaluate the video frames to separate foreground objects from background objects, measure appearance and kinematic information of the identified foreground objects, and track foreground objects moving across the scene (i.e., the field of view of the camera). As a result, the data collector module 202 generates a set of data values characterizing appearance and kinematic aspects of the objects depicted in video frames.

At step 310, the data collector module 202 normalizes each data value to a numerical value falling within a range, e.g., between 0 to 1, inclusive, relative to the type of that data value. For example, values associated with kinematic features are normalized from 0 to 1 relative to other values associated with kinematic features. Doing so converts each value to a common format and allows the neuro-linguistic module 215 to recognize recurring events in the video stream.

After normalizing the values, at step 315, the data collector module 202 identifies additional data associated with the normalized values, such as a timestamp of a given value, an average associated with the data type (e.g., kinematic features, appearance features, location, position, etc.) of the value, and historical high and low values for that data type. Doing so allows the data collector module 202 to readjust the normalization in the event that the video source is modified. Specifically, the data collector module 202 references the identified historical values and averages to readjust the normalization.

At step 320, the data collector module 202 sends a vector of the normalized values and associated data to the sensory memory component 135. As stated, the sensory memory component 135 stores the normalized values and associated data. The neuro-linguistic module 215 may then retrieve the normalized values from the sensory memory component 135 and perform linguistic analysis thereafter.

Figure 4:
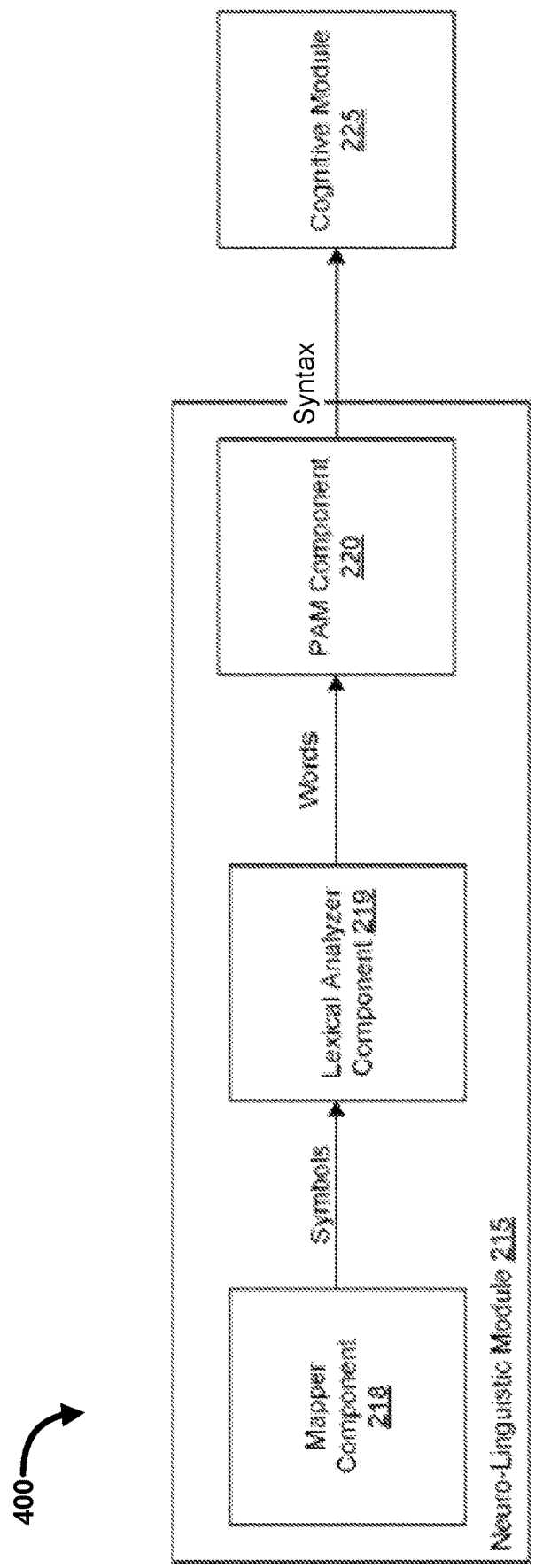
FIG. 4 illustrates components of the neuro-linguistic module, according to some embodiments.

FIG. 4 illustrates components of the neuro-linguistic module 215, according to some embodiments. As stated, the mapper component 218 generates a stream of symbols based on an input sample sent from a given source (e.g., a set of video frames). Illustratively, the mapper component 218 sends the stream of symbols to the lexical analyzer component 219. The lexical analyzer component 219 builds a dictionary of words, i.e., combinations of symbols, based on statistical frequencies of groups of symbols appearing in the stream. The lexical analyzer component 219 outputs statistically significant words to the PAM component 220 for syntactic analysis based on groups of words and eventually to the cognitive module 225. The output from the lexical analyzer may be a data structure including the statistically significant word along with an anomaly score for the word and an alert directive.

Figure 5:
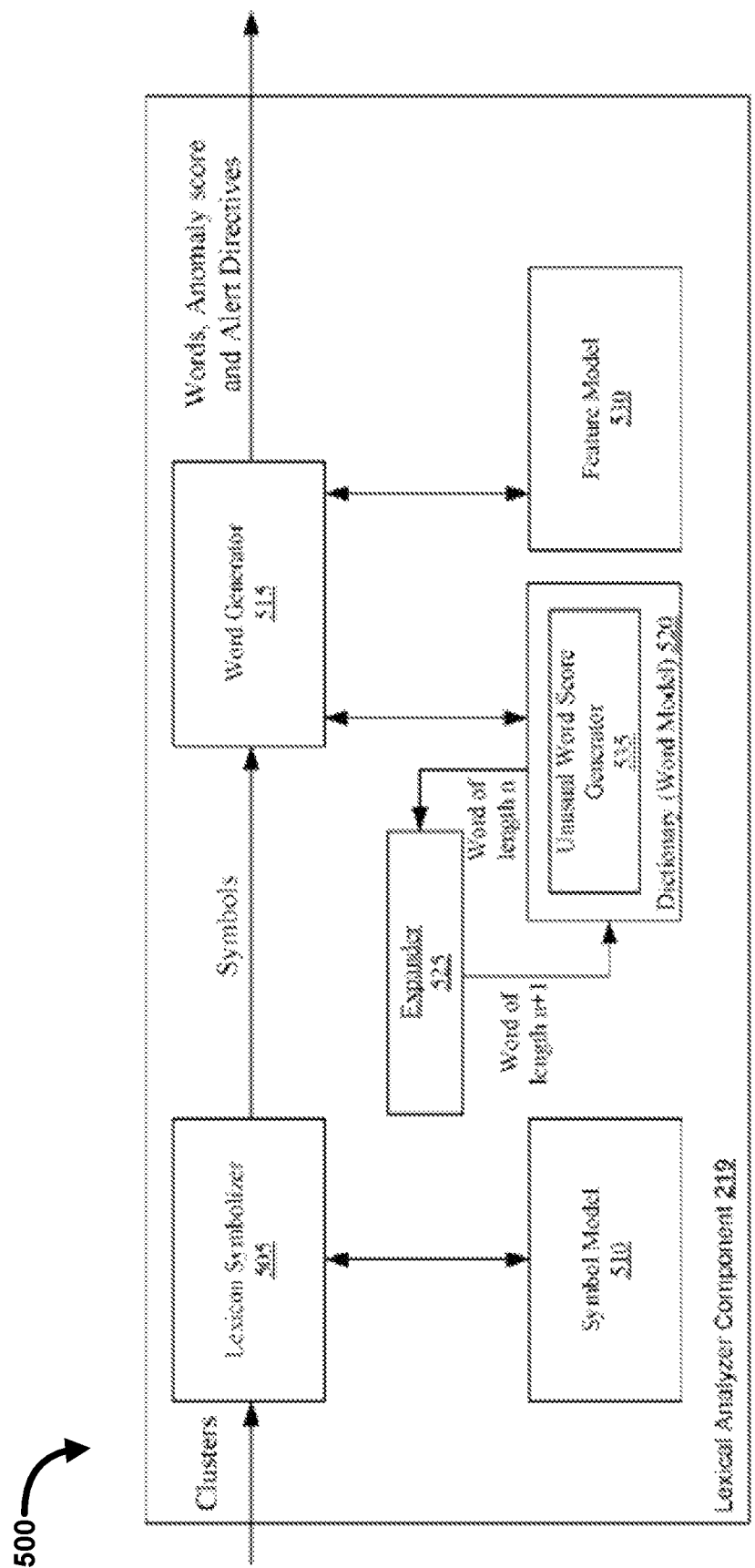
FIG. 5 is a system diagram of the lexical analyzer component, according to some embodiments.

FIG. 5 is a system diagram of the lexical analyzer component 219, according to some embodiments. As discussed above, the lexical analyzer component 219 receives a sample as a stream of symbols representing clusters from the mapper component describing a scene. Each symbol of the stream of symbols includes statistical data related to the symbol, such as the mean value of the cluster and an indication of a distance the actual value of the cluster is in relation to the mean value. A lexicon symbolizer 505 takes the symbol from the stream and matches the symbol against a set of known symbols in a symbol model 510. If the symbol matches a known symbol, the known symbol is retrieved from the symbol model 510. If the symbol does not match a known symbol, the symbol is added to the symbol model 510. The symbol and associated statistical data may then be passed to a word generator 515.

In some embodiments, the word generator 515 determines which words to include in a dictionary or word model 520 based on the statistical data. The statistical data also allows the word generator 515 to determine which combinations of symbols to further evaluate in higher-level learning models (e.g., words with more symbols). Once the one-symbol words are identified, an expander 525 is invoked which advances to the next level to identify combinations having an additional symbol length. The lexical analyzer component 219 continues learning words in such a manner for each level up through the highest level, where lexical analyzer component 219 learns words having a maximum length. In some embodiments, the highest level is the fifth level.

In some embodiments, the lexical analyzer component 219 includes a feature model 530 that includes a generalization of the previously identified words. Specifically, the word generator 515 identifies features of specific symbols in each word. The word generator 515 may then abstract the symbol combinations based on the identified features. The word model 520 may contain words made up of specific combinations of symbols and a corresponding set of statistics, such as the frequency of occurrence of the word and features described by the symbols. Based on features shared between words and the number of occurrences of the word, the word with the highest number of occurrences for a given set of features is added to the feature model 530. For example, assume that three features f1, f2 and f3 are identified by the mapper component. Further, each feature has two symbols associated, such that f1={A,B}2={C,D}, and f3={E, F}. For example, if two words AC and BD both include features f1 and f2, but AC occurs many more times than BD, then AC and f1f2 may be added to the feature model 530 as correlated. Generating the feature model 530 allows the lexical analyzer component 219 to evaluate a statistical significance of general combinations of symbols in addition to specific combinations. For example, assume that the lexical analyzer component 219 frequently observes the words AC, BC, and CE. As a result, the generalized feature combinations of AC is f1f2, BC is f1f2, and CE is f2f3. The generated feature model allows the lexical analyzer component 219 to evaluate the statistics of generalized words occurring in the input stream. In addition, an anomaly score generator 535 allows the lexical analyzer component 219 to identify anomalous words. For example, AD, BD, and DF map to feature combinations f1f2, f1f2, and f2f3, respectively, but may nonetheless be anomalous, with a corresponding high anomaly score, if not frequently observed. Thus, the feature model 530 allows the lexical analyzer component 219 to identify important or abnormal symbols from observed feature combinations.

Figure 6:
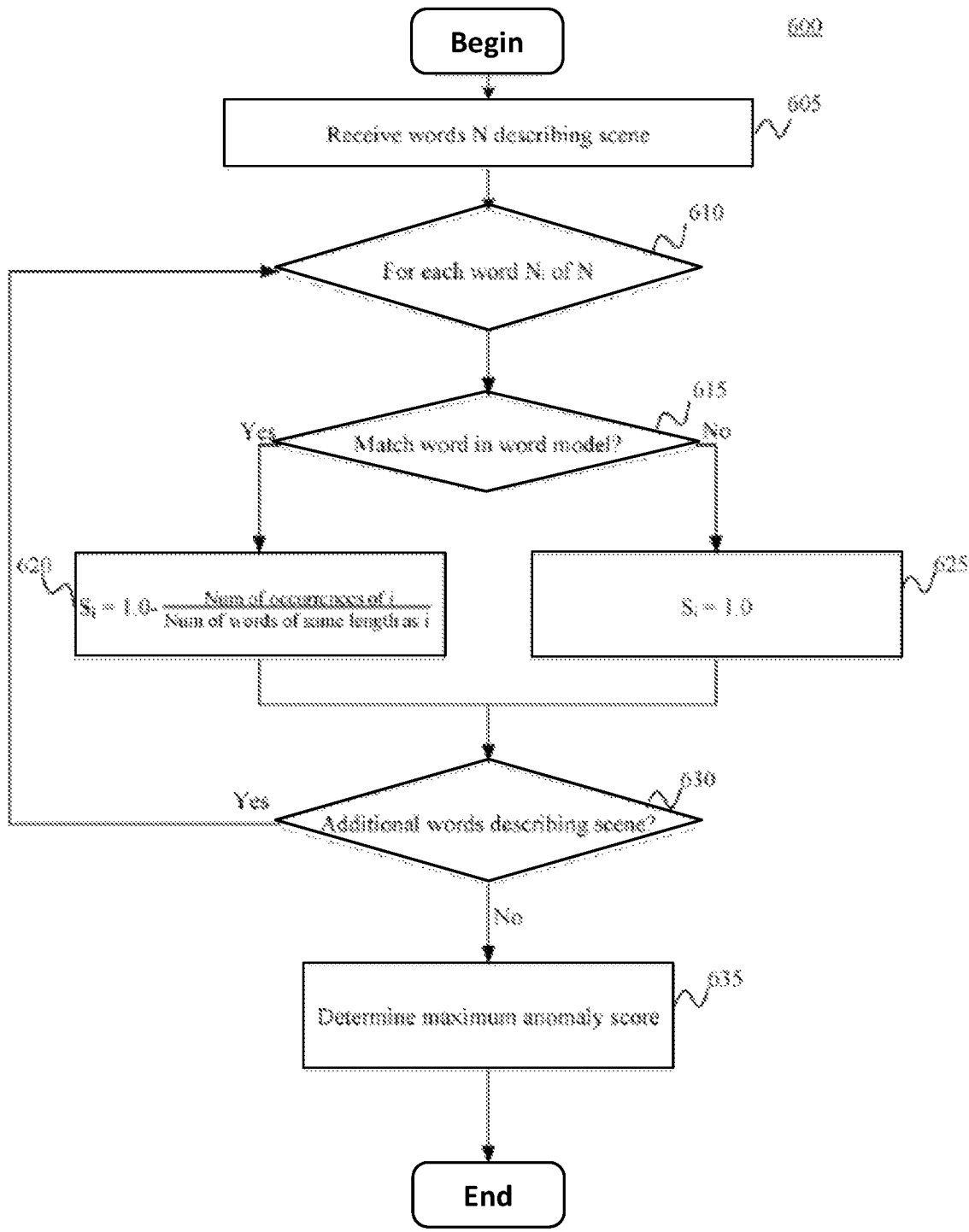
FIG. 6 illustrates a method for determining an unusual word score, according to some embodiments.

FIG. 6 illustrates a method for determining an unusual word score 600, according to some embodiments. In some embodiments, the unusual word score generator 535 may also determine a final anomaly score S for an input sample. Each input sample may be described by a total number of words N generated for the input sample. An unusual word score $S_i$ may be determined for each word $N_i$ of N. At 605, the unusual word score generator 535 receives words N and at 610, each word $N_i$ of N may be matched against words already in the word model 530 at 615. At 620, where the word $N_i$ matches a word already in the word model 530, the anomaly score $S_i$ for the word $N_i$ may be determined as a function of the number of occurrences of the word and the total number of occurrences of words of the same length as $N_i$, such that $S_i$=1.0−(number of occurrence of $N_i$/number of occurrence of all words with the same length as $N_i$). The anomaly score $S_i$, is computed based in part on the length of the word to normalize the anomaly score with other words of the same length. Normalization with other words of the same length is used as longer words tend to be more subject to noise in a signal while shorter words tend to be more stable. Additionally, as subsets of longer words must exist as shorter words, shorter words tend to appear more frequently than longer words, potentially introducing bias into the results. Where the word $N_i$ does not match a word already in the word model 530, the anomaly score $S_i$ for word $N_i$ may be set to the maximum anomaly score, or 1.0 in this example. Alternatively a separate model may be used for determining the unusual word score of a new word may be used. At 630, additional words describing the scene may be checked. At 635, the anomaly score S may be determined based on the maximum of the individual unusual word scores, such that $S=\max(S_1, \ldots S_i, \ldots S_N)$. This anomaly score may then be output for use by, for example, the cognitive model to determine whether an alert should be raised, along with the word and an alert directive, which encodes the word as a behavioral alert based rule in a data structure for further processing, for example, by the PAM component 220.

As discussed above, the PAM component 220 receives a stream of words from the lexical analyzer component 219 and outputs a syntax to the cognitive model 225. The syntax, also referred to as a precept, is a set of phrases based on the words output from the lexical analyzer components. In some embodiments, the syntax may comprise up to eight pairs of words. The PAM component 220 outputs the syntax based on a generated connected graph representing the words and relationships between the words.

Figure 7:
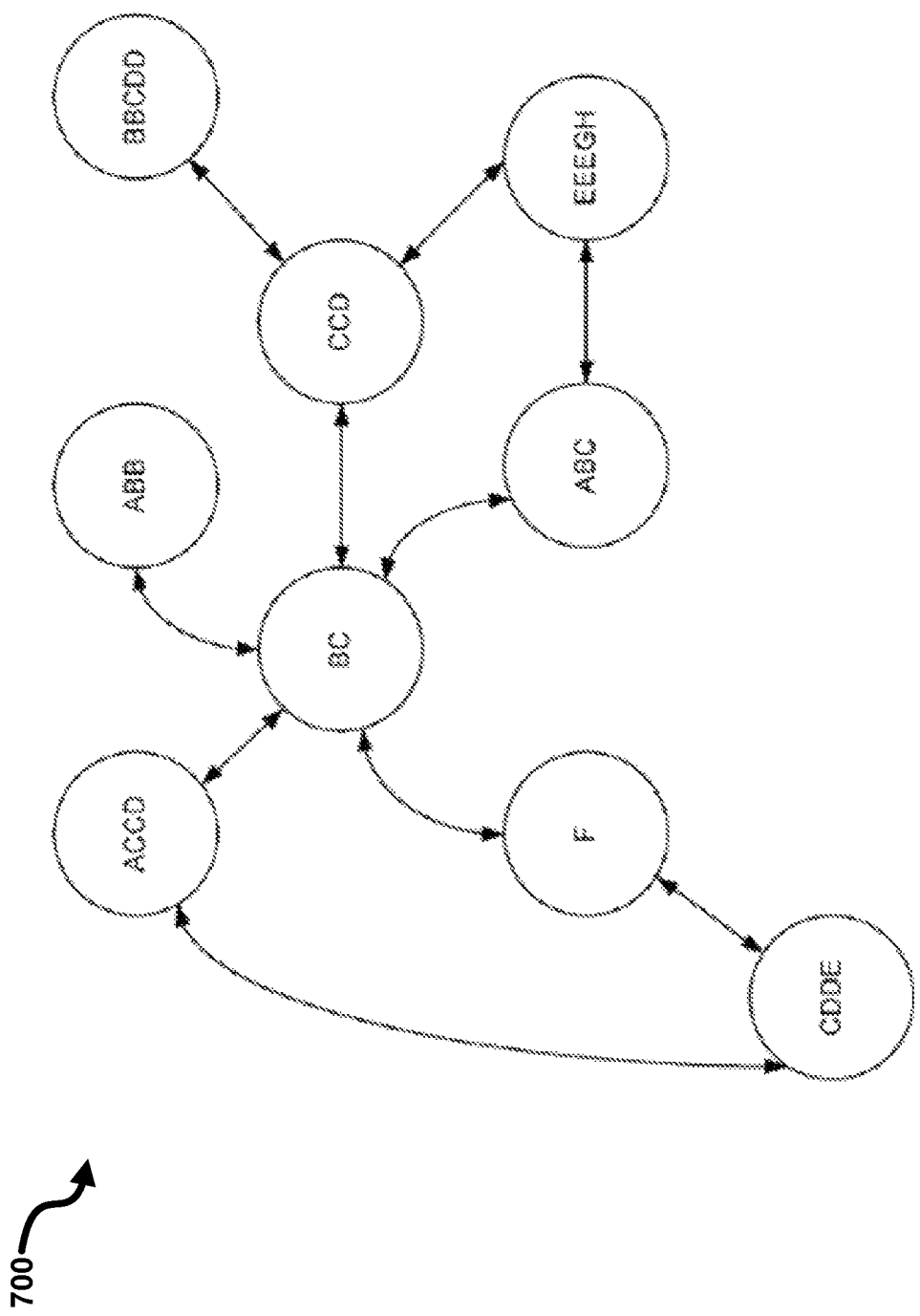
FIG. 7 illustrates an example connected graph generated by the perceptual associative memory (PAM) component, according to some embodiments.

FIG. 7 illustrates an example connected graph 700 generated by the PAM component 220, according to some embodiments. The graph 700 establishes the syntax of phrases identified by the PAM component 220. A phrase is a sequence of words that may occur in the word stream based on probabilistic relationships of each word appearing in the order of a given phrase (a given path through the connected graph). The PAM component 220 outputs phrases observed in the stream of words output by the lexicon having co-occurring symbols generated by the mapper with a statistical significance score exceeding a given threshold.

The nodes (represented by the circles) represent identified words sent by the lexical analyzer component 219. The undirected edges connecting the nodes represent that the PAM component 220 has observed the connected words to co-occur in the stream of words. Further, the edges may be weighted based on a statistical significance score between two co-occurring words. In addition, the PAM component 220 may reinforce or decay the edges based as the statistical significance score increases or decreases, respectively. For example, the statistical significance score may increase if the PAM component 220 observes further co-occurrences between two words. The PAM component 220 can reinforce the edge connecting both words in the graph as a result of the increase.

Figure 8:
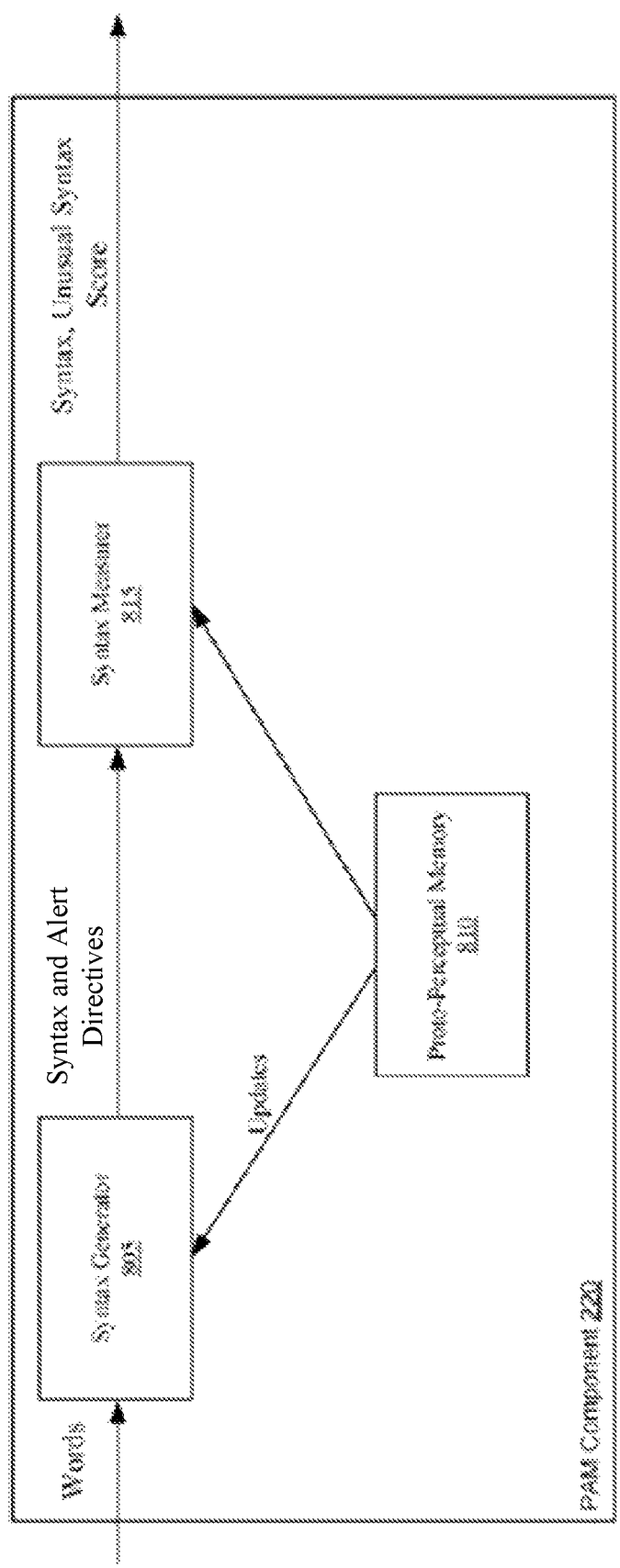
FIG. 8 is a system diagram of the PAM component, according to some embodiments.

FIG. 8 is a system diagram of the PAM component 220, according to some embodiments. The PAM component 219 may include a syntax generator 805 which receives words and communicates with and is updated by a proto-perceptual memory 810. The proto-perceptual memory 810 stores observations regarding syntax phrases and may contain syntax phrases which are not statistically significant. As a part of generating the unusual syntax score, the proto-perceptual memory 810 may contain information related to a feature weight (FeatureWeight), a combined word list (combinedWordList), and combined word frequency list (combinedWordFreqSzList). The feature weight (FeatureWeight) indicates how frequently a particular input feature appears for a given cluster or symbol. The combined word list (combinedWordList) comprises all possible combination of word pairs and the word's alphabet, and the combined word frequency list (combinedWordFreqSzList) indicates a number of occurrences for each particular combination of words. The proto-perceptual memory 810 receives input words from the lexicon and updates the feature weight, combined word list, and combined frequency list iteratively and adaptively. The syntax generator 805 is periodically updated by the proto-perceptual memory 810, and the syntax generator 805 can generate syntaxes based on the received words, as well as alert directives. A syntax measurer 815 compares the generated syntaxes to those stored syntaxes in the proto-perceptual memory 810 to determine how unusual the currently generated syntax is relative to previously generated syntaxes. This determination is reflected in an unusual syntax score associated with the newly generated syntax. As shown in FIG. 8, the output from the syntax measurer 815 can include the syntax and the unusual syntax score (and, optionally, the alert directives).

In some embodiments, one or more alert directives are generated by one or more components of a neuro-linguistic module (e.g., the neuro-linguistic module 215 of FIG. 4), such as a lexical analyzer component (e.g., the lexical analyzer component 219 of FIG. 4, the words output from the lexical analyzer component 219 of FIG. 4 (e.g., the lexicon generated thereby), and/or the PAM component (e.g., the PAM component 220 of FIG. 4). In some implementations, an alert directive can be defined as a system generated meta-rule that is behavioral rule based (e.g., a rule that is generated based on observed behavior).

In some embodiments, the unusual syntax score comprises a syntactic measure and a semantic measure. The syntactic measure measures the structure of the syntax and the semantic measure measures the meaning of the structure. For a particular generated syntax, the syntactic measure looks at how the nodes that make up the particular syntax are linked together. For example, a generated syntax may include two nodes, BC and ABC, and be compared to a stored syntax including three nodes, BC, ABC, and CCD. The syntax measure is an indication of how similar the structure of the two syntaxes are, for example, even though the two syntaxes have a different number of nodes. The semantic measure looks to the features of the nodes and measures how similar these features, on which the links are based, are.

Figure 9:
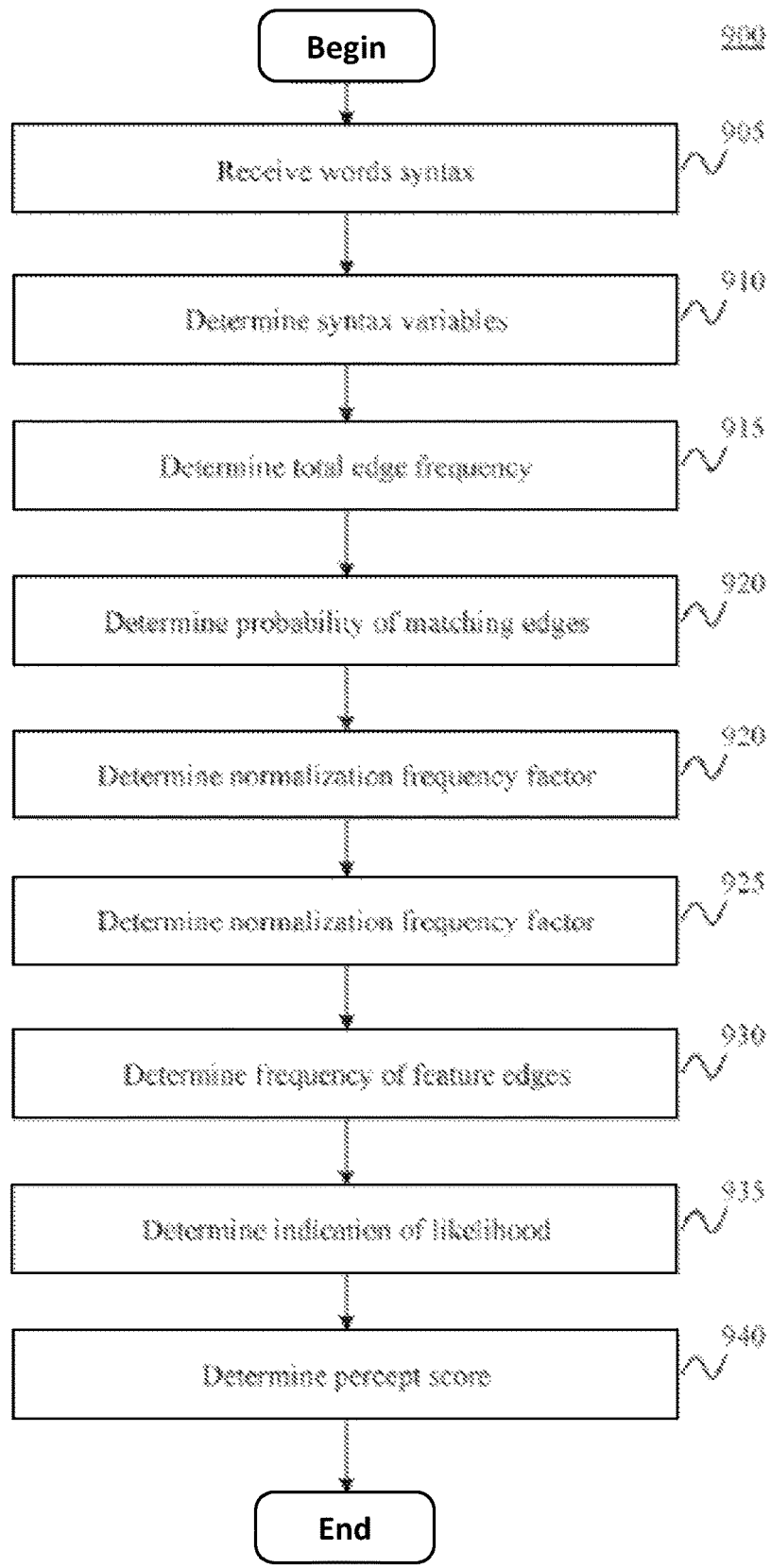
FIG. 9 illustrates a method for determining an unusual syntax score, according to some embodiments.

FIG. 9 illustrates a method 900 for determining an unusual syntax score, according to some embodiments. The method begins as 905 when a generated syntax is received. At 910, variables related to the generated syntax may be determined. The syntactic measure may comprise a measurement based on two steps which looks at a total edge frequency (sTotalEdgeFreq) and a matching edges index (matchEdgesIdx) between the generated syntax to the proto-perceptual memory 810. In determining the total edge frequency, the most significant node links may be determined for a number of nodes based on word pairs having the highest number of occurrences in the combined word frequency list. In some embodiments, the number of nodes may be eight nodes.

At 915, a total number of occurrences for the number of nodes having the highest number of occurrences may then be summed up to determine the total edge frequency (maxFreqs). The generated syntax may then be matched against the combined word list. In some embodiments, the word pairs may be matched against a number of highest occurring word pairs from the combined word list, such as the top 128 pairs of words, in order to reduce the amount of computation required.

At 920, a probability of matching edges (matchEdgesProb) for each word pair i may be determined based on the combined word frequency list (combinedWordFreqSzList(i) for the matched word pair, divided by the total edge frequency (maxFreqs), such that matchEdgesProb(i)=combinedWordFreqSzList(i)/maxFreqs for each word pair. These resulting syntactic scores for each word pair may then be fused with the semantic measure to determine an overall unusual syntax score at a later stage.

In some embodiments, the semantic measure may look at the features of the nodes of the generated syntax and proto-perceptual memory 810 and may comprise a normalizing factor for the frequency statistic (sFreqStat), a frequency of feature edges (sfreqOfFeatureEdges), an indication of edge frequency likelihood (eflikelihood) and a syntax edge likelihood (perceptEdgeLikelihood) steps. As discussed above, a generated syntax may include eight word pairs, each of which may contain up to 32 features. Each feature may fall into a particular feature bin. In some embodiments, there may be 32 feature bins.

At step 925, a normalizing factor for the frequency statistic (FreqStat) may be determined. Determining the normalization frequency factor may include summing the feature weight (FeatureWeight) for each feature and determining the maximum (e.g., highest) feature weight for each feature. An adjustable tuning factor (a) between 1.0 and 0 may also be included to allow tuning of the normalizing factor for the frequency statistic. Based on this sum and maximum feature weight, the normalization frequency factor may be calculated for each feature bin, $bin_i$, such that $sFreqStat(bin_i)=a*sum(freqStat(bin_i))\_+(1-a)*max(freqStat(bin_i))$.

At step 930, a frequency of feature edges (sFreqOfFeatureEdges) may be determined. Based, in part, on the normalizing factor for the frequency statistic, the frequency of feature edges may be calculated to match the generated syntax feature and feature weights for the frequency of feature edges step to normalize each syntax feature weight. For example, the frequency of feature edges may be determined as a normalizing factor for the frequency statistic (featStat) for each feature, $feature_i$, and each feature bin, $bin_i$, such that $featStat(feature_i, bin_i)=featureWeight(feature_i, bin_i)/sFreqsStat(feature_i)$.

At step 935, an indication of edge frequency likelihood may be determined. The normalizing factor for the frequency statistic may be used to determine the indication of edge frequency likelihood (eflikelihood) by determining a precept words likelihood. In determining the precept words likelihood, for each word in the generated syntax, the sum (sumProb) of the normalized feature factors (featStat) for each word is determined, such that sumProb (word)=sumProb (word)+featStat(word, feature). The conditional probability for each word may be determined by multiplying the normalized feature factors for each word, such that condProb(word)=condProb(word)*featStat(word, feature). An indication of likelihood for a word (wliklihood) may then be determined based on the sum of the normalizing factor for the frequency statistic, conditional probability of each word and the length of the word (len), such that wlikelihood(word)=(len*a*condProb(word)=(1−a)*sumProb(word))/len. A tuning factor, a, may have a value between 0 and 1 and allow for tuning the relative weight between the conditional probability and the sum of the probability.

At step 935, an syntax edge likelihood (perceptEdgeLikelihood) may be determined. The syntax edge likelihood step (perceptEdgeLikelihood) may determine an indication of a conditional probability of each word pair based on the conditional probability for each word. The conditional probability of each word pair may be determined by summing the indication of likelihood for each word of the word pair such that sumProb(word_pair)=sumProb(word_pair)+wlikelihood (word). Additionally, the conditional probability of the word pair may be determined by multiplying the indication of likelihood for each word of the word pair such that condProb(word_pair)=condProb(word_pair)*wlikelihood (word). The percept edge likelihood (perceptEdgeLikelihood) may be determined based on the indication of likelihood for each word, the conditional probability of the word pairs, and the length of the word (len), such that plikelihood (word_pair)=((len*a*condProb(word_pair))+(1−a)*sumProb(word_pair)))/len. The conditional probability of each word_pair collapses the conditional likelihood of the individual words into word pairs.

At step 940, a percept score (perceptScore) may be determined. Once the syntactic and semantic measures for the generated syntax is determined, the syntactic and semantic measures may be combined to determine a percept score or an unusual syntax score for the generated syntax. This determination may be made for each word pair such that the syntax score (syntaxScore) is based on the conditional probability of the word pairs (plikelihood) and the probability of matching (matchEdgesProb), such that syntaxScore=syntaxScore+plikelihood (word_pair) *matchEdgedProb (word_pair). The unusual syntax score may then be 1.0−syntaxScore.

Figure 10:
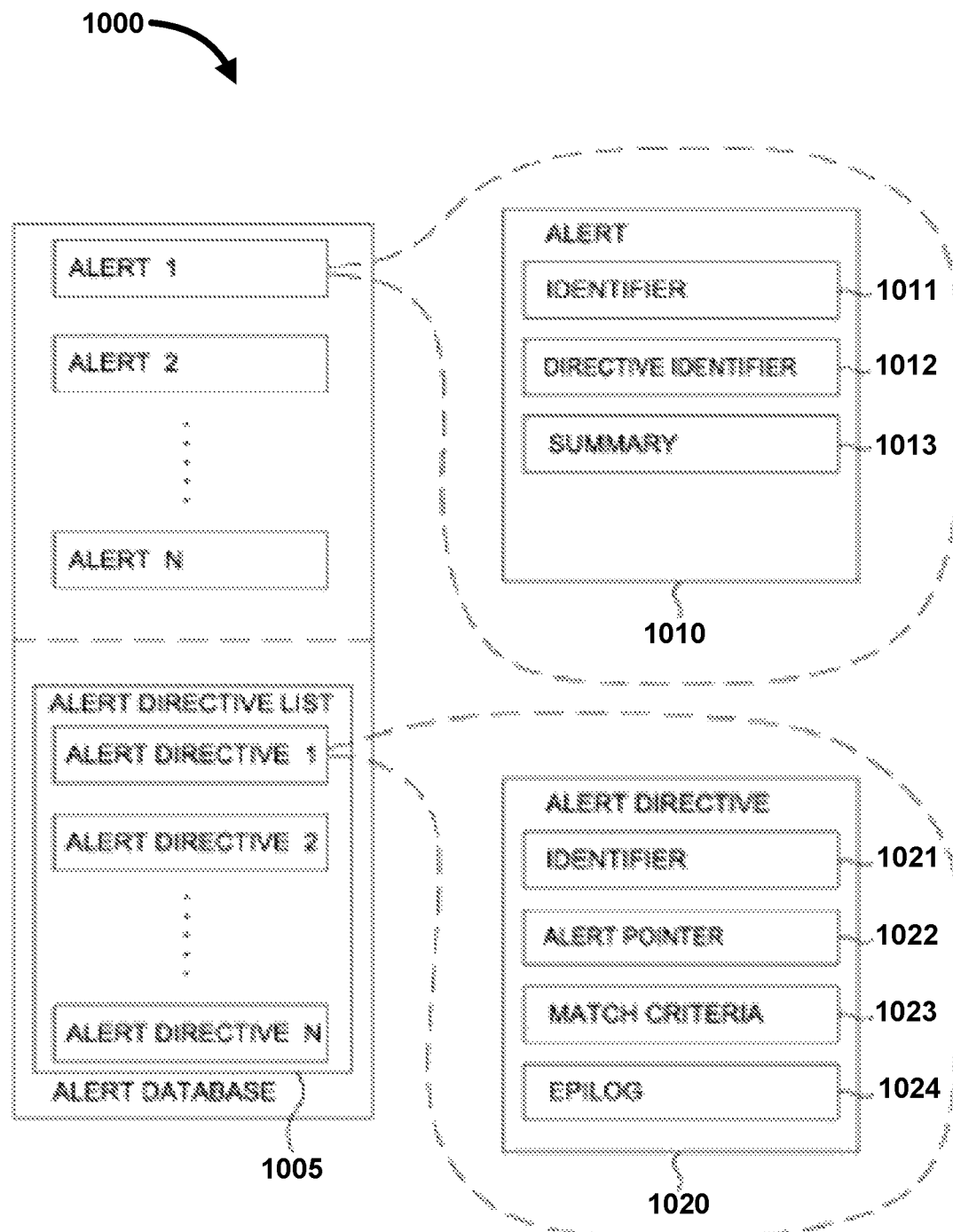
FIG. 10 illustrates an example of an alert database in a client device, according to some embodiments.

FIG. 10 illustrates an example of an alert database in a client device, according to some embodiments. The alert database 1000 stores previously issued alerts that a user can parse through to create an alert directive. As shown, the alert database 1000 includes a plurality of alerts and an alert directive list 1005. Each alert 1010 includes an identifier 1011, a directive identifier 1012, and a summary 1013. The identifier 1011 is a unique numerical value assigned to the alert 1010. The directive identifier 1012 is a numerical field that indicates whether the alert 1010 has been assigned an alert directive.

The summary 1013 is a data-payload that contains a concise description of the data characterizing the alert. The summary 1013 may include information about the type of anomaly, what time the anomaly occurred, height and width values and an x- and y-coordinate of an object (if the anomaly occurred at a point in time), a set of x- and y-coordinates corresponding to a trajectory (if the anomaly occurred over a series of frames), and the like. Alert directives evaluate object behaviors or object types (or both) that match the information provided in the summary 1013.

The alert directive list 1005 includes a plurality of alert directives. Each alert directive 1020 has an identifier 1021, an alert pointer 1022, match criteria 1023, and an epilog 1024. The identifier 1021 of the alert directive is a unique numerical value assigned to an alert directive. Alert pointer 1022 is a pointer to the original alert to which the alert directive corresponds. By pointing to the original alert, the alert directive 1020 can access the data provided by summary 1013. In one embodiment, the information contained in summary 1013 may be stored as a data packet in a corresponding alert directive 1020.

Match criteria 1023 contains user-specified information of how the alert directive should process a certain event, such as whether the machine learning engine should publish an alert, not publish an alert, or discard the behavior, and whether to match an alert directive to a behavior or to an object type (or both). For example, if a user chooses to disregard matching behavior for an "unusual location" alert, the machine learning engine may create alerts for an object at rest at the location specified by the alert directive, and it may create alerts for an object moving rapidly through the same location. As another example, if a user chooses to disregard types in matching for an "unusual location" alert, the machine learning engine may create alerts for an object corresponding to a learning based classification type 1 (e.g., a car) positioned at the location, and the machine learning engine may also create alerts for an object correspondence to a learning based classification type 2 (e.g., a person) positioned at the location.

The epilog 1024 is an array of tolerance values of each corresponding alert characteristic in the data provided by summary 1013. Tolerances provide the machine learning engine with flexibility in matching object behaviors and types to an alert directive, as the likelihood of matching two objects having the same characteristics (height, width and the center (x,y) position) in a scene is very low. In one embodiment, a user defines these tolerances by using a graphical editor on a selected alert. By drawing a bounding box around the object that triggered the alert, the user can adjust the tolerances for the alert directive, creating a range for several characteristics of the selected alert (e.g., for the heights and widths of the object).

In some embodiments, an anomaly detection system includes a machine learning engine that learns what is "normal" behavior by observing the environment. The anomaly detection system then generates, at a first time, a first alert in response to detecting abnormal (not normal) behavior based on a first timeline (e.g., a first period of observation). If the behavior that triggered the first alert is subsequently deemed to be normal (e.g., based on further/subsequent learning by the machine learning engine during a second period of observation), the anomaly detection system will generate a behavior-based rule such that further occurrences of that behavior will not trigger an alert unless a user explicitly requests that the behavior trigger an alert. For example, a first user may browse (e.g., via a graphical user interface ("GUI") of a compute device associated with the first user and/or with the anomaly detection system) a library of alerts and/or rules (such as the alert database 1000 of FIG. 10) generated by the anomaly detection system and provide an input (e.g., match criteria, such as match criteria 1023 of FIG. 10, which can include a score and/or a range of values) to the anomaly detection system to specify that a selected behavior should be deemed "abnormal" or trigger an alert, notwithstanding that the computer-generated rule would not trigger an alert for that selected behavior. In other words, the user provides input that the anomaly detection system uses to define an alert directive that overrides the anomaly detection system's behavior-based rule. For example, the anomaly detection system may determine that cars are not abnormal within a scene, however the first user may define an alert directive such that he/she is alerted when a red car (a subset of cars) is detected. A second user may also wish to define an alert directive for a behavior (e.g., the behavior selected by the first user) with a different degree of granularity or specificity from that of the first user. For example, the second user may define an alert directive such that he/she is alerted when either a red car or a blue car (also a subset of cars) is detected.

In some embodiments, an anomaly detection system includes a machine learning engine that learns what is "normal" behavior by observing the environment. The anomaly detection system then generates, at a first time, a first alert in response to detecting abnormal (not normal) behavior based on a first timeline (e.g., a first period of observation). The anomaly detection system will generate a behavior-based rule such that further occurrences of that behavior will trigger an alert unless a user explicitly requests that the behavior not trigger an alert. For example, a first user may browse (e.g., via a graphical user interface ("GUI") of a compute device associated with the first user and/or with the anomaly detection system) a library of alerts and/or rules generated by the anomaly detection system and provide an input (e.g., match criteria, such as match criteria 1023 of FIG. 10, which can include a score and/or a range of values) to the anomaly detection system to specify that a selected behavior should be deemed "normal" or should not trigger an alert, notwithstanding that the computer-generated rule would trigger an alert for that selected behavior. In other words, the user provides input that the anomaly detection system uses to define an alert directive that overrides the anomaly detection system's behavior-based rule. For example, the anomaly detection system may determine that cars are abnormal within a scene, however the first user may define an alert directive such that he/she is not alerted when a red car (a subset of cars) is detected. A second user may also wish to define an alert directive for a behavior (e.g., the behavior selected by the first user) with a different degree of granularity or specificity from that of the first user. For example, the second user may define an alert directive such that he/she is not alerted when either a red car or a blue car (also a subset of cars) is detected.

According to some embodiments, an anomaly detection component can include a two stage normalization process via, for example, an unusual word normalizer and an unusual syntax normalizer first stage and an anomaly standardizer (or normalizer) second stage. In certain embodiments, the anomaly detection component can include additional normalizers based on any additional modules in the neuro-linguistic module, such as an unusual map normalizer and/or trajectory normalizer (collectively normalizers). The unusual word normalizer and the unusual syntax normalizer can receive raw unusualness scores from lexical analyzer component and PAM component, respectively, and output a normalized percentile as against previous unusual scores. The raw unusualness scores can indicate how unusual a characteristic observed in the input data is, based generally on how close the observation is to particular stable neuro-linguistic model. For a particular sample, the lexical analyzer component can output a word along with a raw unusualness score for the word, based on how far the sample is from the word in the word model. This output can be received by the unusual word normalizer for comparison and normalization against an unusual word model, which indicates how unusual the raw unusualness score is as compared to previous raw unusualness scores historically. For example, a noisy sensor can result in relatively large raw unusualness scores to be output from the lexical analyzer, but historically as this relatively large raw unusualness score happens relatively often, the normalized anomaly score can be low. Likewise, the output of the PAM or other components can be received by their respective normalizers, for comparison and normalization against an unusual syntax model or another unusual model.

An anomaly standardizer can be functionally similar to the normalizers and can receive input from the output of the normalizers. The unusual word normalizer, the unusual syntax normalizer, and other normalizers output a normalized anomaly score indicating, as a percentile, overall unusualness of the data output from their respective neuro-linguistic module component as compared to historical scores. The anomaly standardizer then receives, as input, these normalized anomaly scores from the normalizers. This two stage normalizing process allows the anomaly standardizer to standardize scores across all of the other normalizers to generate a single anomaly score. This single anomaly score identifies the overall unusualness of observed data generated based on observations of a scene and can be used to raise an alert.

Generally, the various normalizers, as well as the anomaly standardizer, can operate similarly, but vary with respect to inputs and what resulting the output represents, as discussed above. In some embodiments, the normalizers can take a numerical approach to the received raw unusualness scores in order to rank the unusualness scores in percentiles without assuming any particular distribution of the scores. For example, in some embodiments, a normalizer can build a historical pool of unusualness scores into the unusual model. The normalizer can then determine the percentile in which a particular unusualness score falls within based on a comparison based on this unusual model.

The historical pool can be based on unusualness scores received by the normalizer. As raw unusualness scores are received, the scores are stored in the workspace. After a threshold number of unusualness scores or a certain amount of time has passed, an unusual model can be created or updated based on a batch of the stored unusualness scores. In creating or updating the unusual model, the encoder can encode the unusualness scores.

For some embodiments, the unusualness scores can be encoded as a histogram. Encoding as a histogram requires minimum computation as the value of the scores to be encoded just need to be compared to the value of the bins. However, where the unusualness scores may be any value between 0 and 1 with no assumptions about the distributions of the unusualness scores, the number of bins that may be needed may be very large and resulting high memory consumption. Additionally different data can require a different number of bins and bin sizes, requiring too much tuning to be generalized.

In some embodiments, the unusualness scores can be encoded as a probability distribution. Encoding as a probability distribution is relatively easy to calculate based on the mean and variance. Resolution can be enhanced with information related to the standard deviations, such as the first and second standard deviations left and right of the mean. However, probability distributions can be quite lossy and not preserve much information, as well as require assumptions about the distribution of the scores (e.g., normal, Gaussian, etc. distribution), and it is relatively computationally intensive to compute percentile rankings based on the probability distribution.

In other embodiments, the unusualness scores can be encoded as a probabilistic histogram stored, for example, in the workspace. A probabilistic histogram builds a probability distribution across each of a set of bins. This probabilistic histogram can be a lossy encoding of the original unusualness scores, but enables a relatively high level of compression of the original unusualness scores while preserving relatively more detail than the probability distribution. While the probabilistic histogram can be more computationally expensive to build relative to the histogram and probability distributions, the probabilistic histogram allows for relatively cheap encoding and decoding with minimal errors, a relatively easy computation of percentiles after the unusual model is built, and does not necessarily assume any particular distribution.

A probabilistic histogram can be built, in some embodiments, for values between 0 and 1, by arbitrarily dividing up 0 to 1 into ten bins which may or may not have the same size. For example, bins corresponding to lower scores may be larger than those corresponding to higher scores to increase resolution at the high end. Each bin can be described by bin variables. These bin variables may comprise seven variables, including a mean of the values within a bin (binMean), a number of values to the left of the mean (binNl), a standard deviation of the values to the left of the mean (binStdL), a number of values to the right of the mean (binNr), standard deviation of the values to the right of the mean (binStdR), a minimum value of the bin (binMin), and a maximum value of the bin (binMax). The bin variables can be included to define each bin and provide an indication of the distribution of the values in the bin. For example, the standard deviation of the values to the right and left increases the resolution and reflect skew on a per bin basis. For example, certain bins can be skewed left or right, respectively, based on the standard deviation values to the left and right. Based on the bin variables, a pool of unusualness scores for each bin can be reconstructed.

The decoder decodes the probabilistic histogram, as described by the bin variables, reconstructing a pool of scores based on the encoded unusualness scores. In some embodiments, based on the mean, the number of values to the left and right of the mean and the standard deviations to the left and right of the mean, a distribution can be determined. For example, the standard deviation and number of values to sides of the mean can indicate a distribution sigma [x0, x1, x2, x3] may be a normal distribution (i.e., [0.68, 0.27, 0.04, and 0.01]), where each band has the width of one standard deviation. Based on the number of values to the left and right of the mean, the number of encoded scores, sigma_n, can be determined. A step value can be determined based on the standard deviation divided by a size of a standard deviation step (i.e., step=std/size(x_i). An encoded score k can then be calculated as sample (k)=mean+/−ith (x_i)*std+/−(k*step). The minimum and maximum value for each bin can then be appended to the reconstructed scores such that [min, samples, max] represents the reconstructed scores for each bin.

After receive an unusualness score, a normalizer can decode its respective unusual model and compare the received unusualness score, x, to the decoded samples in unusual model, xs. The overall sample size of xs after decoding can be represented as sz_xs. The decoded unusual model xs can be filtered such that samples of xs smaller than x (i.e., xs<x) can be represented by xs_less, the size of which can be represented as sz_xs_less. The decoded unusual model xs can also be filtered for values close to the received unusualness score x such that (x-delta)<xs<=(x+delta), as unusualness scores can be continuous across a range. Values close to the received unusualness score x can be represented as xs_between and the size of which can be represented as sz_xs between. The percentile normalization for the received unusualness score against the unusual model can then be determined as (100*(sz_xs_less+0.5*sz_xs between))/sz_xs. For example, a model can contain 1000 samples such that sz_xs=1000, where 900 unusual samples have a value less than that of x. Additionally, sz can include 50 scores close to x such that sz_xs between=50. Normalization of this example thus indicates that the received unusualness score is (100*(900+0.5*50))/1000, or in the 92.5 percentile.

In some embodiments, percentile scores for a received unusualness score can be generated against unusual models for various time periods. For example, separate unusual models can be generated for a pool of scores from the last hour, the last day, the last week, and/or all of the scores ever received except those from the last week. A normalized score can then be generated based on the percentile scores for output. This normalized score can be weighted such that scores from a certain time period carry more weight than others. For example, the normalized score can be a function of variables a, b, c, and d where a+b+c+d=1 and the normalized score equal to a*percentile for the last hour+ b*percentile for the last day+c*percentile for the last week+ d*percentile for all scores.

Received unusualness scores can also be added into the unusual model. For example, after the received unusualness score is compared to the decoded unusual model, the received unusualness score can be added to the decoded scores of the unusual model, and encoded. Adding additional received unusualness scores can be performed each time an unusualness score is received, after a certain number of unusualness scores are received, or after a defined period of time.

According to some embodiments, a method for generating a normalized anomaly score for sensor data for use in a neuro-linguistic behavior recognition system is provided. As discussed above, a two stage normalization process can be used in order to standardize unusualness scores received from multiple components into a normalized, overall anomaly score for a scene. In some embodiments, a normalizer receives a raw unusualness score from a component of the neuro-linguistic module, such as the PAM or Lexical Analyzer component generated based on observations of a scene. The normalizer can compare the raw unusualness score to an unusualness model constructed from previous unusualness scores observed by the normalizer. Based on this comparison, the normalizer can generate a normalized percentile indicating how unusual the raw unusualness score is as compared to previous unusualness scores. This normalized percentile can be passed to an anomaly normalizer where the normalized percentile can be compared, to an anomaly model constructed from previous normalized percentiles received from one or more normalizers. Based on this second comparison, a normalized anomaly score can be generated, indicating, as a percentile, overall unusualness of a set of data values.

In some embodiments, a processor-implemented method includes receiving, at a processor, a plurality of words generated based on observations of a lexical analyzer. The processor-implemented method also includes generating, via the processor, a syntax based on at least one word from the plurality of words, and at least one alert directive associated with the at least one word from the plurality of words. The at least one alert directive encodes the at least one word as a behavioral alert based rule. The processor-implemented method also includes comparing, via the processor, the generated syntax to a stored plurality of syntaxes in a proto-perceptual memory to identify an unusual syntax score (e.g., including a syntactic measure of the syntax and a semantic measure of the syntax), and causing an update to a machine learning model based on at least one of the syntax or the unusual syntax score. The processor-implemented method also includes generating an alert based on the at least one alert directive. The processor-implemented method optionally also includes receiving, at the processor, an update from the proto-perceptual memory, the generating the syntax further based on the update. The update can include one or more of: an update to a feature weight for at least one feature of the at least one word, an update to a combined word list, or an update to a combined word frequency list.

In some embodiments, the method also includes iteratively updating the proto-perceptual memory, and generating, via the processor, a plurality of further syntaxes based on the iterative updates to the proto-perceptual memory. In some embodiments, the output includes or is based on a connected graph that includes a plurality of nodes and a plurality of edges. Each node from the plurality of nodes can represent a word from the plurality of words, and each edge from the plurality edges can represent a relationship between a pair of words from the plurality of words.

In some embodiments, each alert directive from the at least one alert directive includes an identifier, an alert pointer, match criteria, and an epilog.

In some embodiments, a processor-implemented method includes observing, via a processor, a plurality of behaviors within a monitored system, and detecting, via the processor and at a first time, that a behavior from the plurality of behaviors is abnormal. The processor-implemented method also includes generating an alert in response to detecting the behavior from the plurality of behaviors at the first time. The processor-implemented method also includes receiving, at the processor and at a second time after the first time, a representation of user-defined match criteria (optionally including a tolerance range) associated with the behavior from the plurality of behaviors, and generating, via the processor, an alert directive (e.g., including an identifier, an alert pointer, match criteria, and an epilog) based on the user-defined match criteria. The processor-implemented method also includes detecting, via the processor and at a third time after the second time, the behavior from the plurality of behaviors, and not generating an alert in response to detecting the behavior from the plurality of behaviors at the third time, based on the alert directive.

In some embodiments, the detecting that the behavior from the plurality of behaviors is abnormal is based on a learning-based classification type. Alternatively or in addition, the detecting that the behavior from the plurality of behaviors is abnormal can be based on neuro-linguistic data generated via perceptual associative learning.

In some embodiments, the generating the alert in response to detecting the behavior from the plurality of behaviors at the first time is based on a learning-based classification type.

In some embodiments, a processor-implemented method includes observing, via a processor, a plurality of behaviors within a monitored system, and detecting, via the processor and at a first time, that a behavior from the plurality of behaviors is normal. The processor-implemented method also includes not generating an alert in response to detecting the behavior from the plurality of behaviors at the first time. The processor-implemented method also includes receiving, at the processor and at a second time after the first time, a representation of user-defined match criteria (optionally including a tolerance range and/or a representation of a location) associated with the behavior from the plurality of behaviors, and generating, via the processor, an alert directive (e.g., including an identifier, an alert pointer, match criteria, and an epilog) based on the user-defined match criteria. The processor-implemented method also includes detecting, via the processor and at a third time after the second time, the behavior from the plurality of behaviors, and generating an alert in response to the detection of the behavior from the plurality of behaviors at the third time, based on the alert directive.

In some embodiments, the detecting that the behavior from the plurality of behaviors is normal is based on a learning-based classification.

In some embodiments, a sensor manager or sensor management component/module provides one or more data collectors/data collector components. In some embodiments, each of the collector components can be associated with a particular input data source, e.g., a video source, a SCADA (supervisory control and data acquisition) source, an audio source, etc. The collectors can retrieve (or receive, depending on the sensor) input data from each source at specified intervals (e.g., once a minute, once every thirty minutes, once every thirty seconds, etc.). The sensor manager can controls the communications between the data sources. In some embodiments, the sensor manager normalizes input data and outputs the normalized data (additional detail can be found in the follow US App. Publications, each of which is herein expressly incorporated by reference for all purposes: US20150046155, US20160170964, and US20160170961).

Some embodiments of the present disclosure are implemented as a program product for use with a computer system. The program(s) of the program product defines functions of the embodiments (including the methods described herein) and can be contained on a variety of computer-readable storage media. Examples of computer-readable storage media include (i) non-writable storage media (e.g., read-only memory devices within a computer such as CD-ROM or DVD-ROM disks readable by an optical media drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present disclosure, are embodiments of the present disclosure. Other examples media include communications media through which information is conveyed to a computer, such as through a computer or telephone network, including wireless communications networks.

In general, the routines executed to implement the embodiments of the present disclosure may be part of an operating system or a specific application, component, program, module, object, or sequence of instructions. The computer program of the present disclosure is comprised typically of a multitude of instructions that will be translated by the native computer into a machine-readable format and hence executable instructions. Also, programs are comprised of variables and data structures that either reside locally to the program or are found in memory or on storage devices. In addition, various programs described herein may be identified based upon the application for which they are implemented in a specific embodiment of the disclosure. However, it should be appreciated that any particular program nomenclature that follows is used merely for convenience, and thus the present disclosure should not be limited to use solely in any specific application identified and/or implied by such nomenclature.

As described, embodiments herein provide techniques for determining a syntax based on a dictionary of words that represents data input from a source (e.g., video source, SCADA source, network security source, etc.) via a neuro-linguistic behavior recognition system. The symbols, words, and syntax form the basis for a linguistic model used to describe input data observed by the behavior recognition system. The behavior recognition system analyzes and learns behavior based on the linguistic model to distinguish between normal and abnormal activity in observed data. Advantageously, this approach does not relying on pre-defined patterns to identify behaviors and anomalies but instead learns patterns and behaviors by observing a scene and generating information on what it ob serves.

While the foregoing is directed to embodiments of the present disclosure, other and further embodiments of the disclosure may be devised without departing from the basic scope thereof, and the scope thereof is determined by the claims that follow.

The invention claimed is:

1. A non-transitory, processor-readable medium storing instructions that, when executed by a processor, cause the processor to:
    receive, from a lexical analyzer, a data structure including at least one statistically significant word, at least one anomaly score for the at least one statistically significant word, and at least one alert directive;
    generate a syntax based on the data structure;
    compare the syntax to a plurality of syntaxes stored in a proto-perceptual memory to identify an unusual syntax score;
    generate output including at least one of the unusual syntax score, the syntax, or the alert directive; and
    generate an alert based on the at least one alert directive and the unusual syntax score.

2. The non-transitory, processor-readable medium of claim 1, further storing instructions to cause the processor to receive an update from the proto-perceptual memory,
    the instructions to generate the syntax including instructions to generate the syntax further based on the update.

3. The non-transitory, processor-readable medium of claim 2, wherein the update includes an update to a feature weight for at least one feature of the at least one word.

4. The non-transitory, processor-readable medium of claim 2, wherein the update includes an update to a combined word list including a plurality of words.

5. The non-transitory, processor-readable medium of claim 2, wherein the update includes an update to a combined word frequency list.

6. The non-transitory, processor-readable medium of claim 1, further comprising:
    iteratively updating the proto-perceptual memory; and
    generating, via the processor, a plurality of further syntaxes based on the iterative updates to the proto-perceptual memory.

7. The non-transitory, processor-readable medium of claim 1, wherein the unusual syntax score includes a syntactic measure of the syntax and a semantic measure of the syntax.

8. The non-transitory, processor-readable medium of claim 1, wherein the output includes a connected graph including:
    a plurality of nodes, each node from the plurality of nodes representing a word from the plurality of words, and
    a plurality of edges, each edge from the plurality edges representing a relationship between a pair of words from the plurality of words.

9. The non-transitory, processor-readable medium of claim 1, wherein each alert directive from the at least one alert directive includes an identifier, an alert pointer, match criteria, and an epilog.

10. A non-transitory, processor-readable medium storing instructions that, when executed by a processor, cause the processor to:
    detect, during a first time period, that a behavior from a plurality of behaviors observed within a monitoring system is abnormal;

generate an alert in response to detecting the behavior from the plurality of behaviors during the first time period;
generate an alert directive based on user-defined match criteria during a second time period;
detect, during a third time period after the second time period, the behavior from the plurality of behaviors; and
not generate an alert in response to detecting the behavior from the plurality of behaviors during the third time period, based on the alert directive.

11. The non-transitory, processor-readable medium of claim 10, wherein the alert directive includes an identifier, an alert pointer, match criteria, and an epilog.

12. The non-transitory, processor-readable medium of claim 10, wherein the instructions to detect the behavior from the plurality of behaviors include instructions to detect that the behavior from the plurality of behaviors is abnormal is based on a learning-based object classification type.

13. The non-transitory, processor-readable medium of claim 10, wherein the instructions to generate the alert in response to detecting the behavior from the plurality of behaviors during the first time period include instructions to generate the alert based on a learning-based object classification type.

14. The non-transitory, processor-readable medium of claim 10, wherein the user-defined match criteria includes a tolerance range.

15. The non-transitory, processor-readable medium of claim 10, wherein the instructions to detect the behavior from the plurality of behaviors include instructions to detect that the behavior from the plurality of behaviors is abnormal is based on neuro-linguistic data generated via perceptual associative learning.

16. A non-transitory, processor-readable medium storing instructions that, when executed by a processor, cause the processor to:
detect, during a first time period, that a behavior from a plurality of behaviors observed within a monitoring system is normal;
not generate an alert in response to detecting the behavior from the plurality of behaviors during the first time period;
generate an alert directive based on user-defined match criteria;
detect, during a second time period after the first time period, the behavior from the plurality of behaviors; and
generate an alert in response to the detection of the behavior from the plurality of behaviors during the third time period, based on the alert directive.

17. The non-transitory, processor-readable medium of claim 16, wherein the alert directive includes an identifier, an alert pointer, match criteria, and an epilog.

18. The non-transitory, processor-readable medium of claim 16, wherein the instructions to detect the behavior from the plurality of behaviors include instructions to detect that the behavior from the plurality of behaviors is normal is based on a learning-based classification.

19. The non-transitory, processor-readable medium of claim 16, wherein the user-defined match criteria includes a tolerance range.

20. The non-transitory, processor-readable medium of claim 16, wherein the user-defined match criteria includes a representation of a location depicted within a video.

* * * * *